United States Patent [19]

Rose et al.

[11] Patent Number: 5,752,244
[45] Date of Patent: May 12, 1998

[54] COMPUTERIZED MULTIMEDIA ASSET MANAGEMENT SYSTEM

[75] Inventors: Scott M. Rose, Northbrook, Ill.; Piyush M. Patel, North Weald, United Kingdom

[73] Assignee: Andersen Consulting LLP, Chicago, Ill.

[21] Appl. No.: 679,573

[22] Filed: Jul. 15, 1996

[51] Int. Cl.$^6$ ................................ G06F 7/00; G06F 7/06
[52] U.S. Cl. ................................ 707/5; 707/8; 707/104
[58] Field of Search ............................ 707/5, 8, 9, 104, 707/200

[56] References Cited

U.S. PATENT DOCUMENTS

| | | | |
|---|---|---|---|
| 5,251,315 | 10/1993 | Wang | 395/600 |
| 5,430,872 | 7/1995 | Dahod et al. | 395/600 |
| 5,493,677 | 2/1996 | Balogh et al. | 395/600 |
| 5,592,375 | 1/1997 | Salmon et al. | 395/207 |
| 5,594,661 | 1/1997 | Bruner et al. | 364/514 R |
| 5,615,112 | 3/1997 | Liu Sheng et al. | 395/615 |
| 5,623,659 | 4/1997 | Shi et al. | 395/608 |
| 5,634,122 | 5/1997 | Loucks et al. | 395/608 |
| 5,649,185 | 7/1997 | Antognini et al. | 395/609 |
| 5,655,117 | 8/1997 | Goldberg et al. | 395/613 |
| 5,659,742 | 8/1997 | Beattie et al. | 395/615 |

OTHER PUBLICATIONS

Cox et al., "Target Testing and the PicHunter Bayesian Multimedia Retrieval System" Proceedings of ADL, 1996.
Cha et al., "Browsing Multimedia Objects via Composite Icons" IEEE Database, 1995.
Hirzalla et al., "A Multimedia Query User Interface" CCECE/CCGEI, 1995.
Salmon et al., "Using Guides to Explore Multimedia Database" IEEE Database, 1989.
Gordon et al., "Retrieval Interfaces for Video Databases" Northwestern University.
Megzari et al., "A Distributed Platform for Interactive Multimedia", MEDIABASE Laboratory.
"IBM Digital Library," Product Brochures and Specifications, Mar., 1995–Mar., 1996.
"Illustra," Product Brochures, Slides, etc., 1994–95, Illustra Information Technologies, Inc.
"Silicon Studio Unleashes Array of New Products, Services for Building Digital Production Studios," News Release, Mar. 4, 1996, Silicon Studio, Inc., a subsidiary of Silicon Graphics, Inc.

*Primary Examiner*—Thomas G. Black
*Assistant Examiner*—Michael J. Wallace, Jr.
*Attorney, Agent, or Firm*—Merchant, Gould, Smith, Edell, Welter, & Schmidt, PA

[57] ABSTRACT

A method, apparatus, and article of manufacture for providing computerized management of multimedia assets of various types, including image, video, audio, text, and program code media types, is disclosed. Multimedia assets are checked into a computer system along with specified characteristics and identification information for the assets. Checked-in multimedia assets are stored in a database on a storage device. Previously checked-in multimedia assets are searched for based on one or more asset characteristics and asset identification information. Multimedia assets are checked out from the database with one of multiple check-out types. Predetermined criteria are used to determine whetern to allow a check-out of a particular multimedia asset.

54 Claims, 14 Drawing Sheets

COMPUTERIZED MULTIMEDIA ASSET MANAGEMENT SYSTEM

FIELD OF THE INVENTION

The invention relates in general to multimedia, and more particularly, to computerized management of multimedia assets.

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

The use of multimedia is increasing at a fast pace. This is particularly true as computer systems are beginning to be used to create multimedia applications. Multimedia applications are becoming more and more complex, including more and more multimedia assets (components). Multimedia assets can be of various types, including image, photograph, animation, video, audio, text, etc. types. As the development of multimedia applications continues, the volume of multimedia assets is growing rapidly. This rapid increase has and continues to significantly increase the cost associated with maintaining and managing the growing volume of multimedia assets.

On the one hand, individual multimedia assets are generally costly to create. In addition to the cost of creating the content of a multimedia asset, it can be costly to obtain access to existing multimedia assets from third parties, including obtaining the right to use such multimedia assets, e.g., in compliance with Copyright law. On the other hand, many asset requirements for a multimedia application can be met with existing assets.

Accordingly, it would be advantageous to reuse existing multimedia assets to the extent possible when developing new multimedia applications. Otherwise, the costs associated with recreating assets or, at least, reobtaining the rights to use existing assets, must be incurred each time a multimedia application is developed. Unfortunately, however, as more and more multimedia assets come into existence, it becomes increasingly difficult to retrieve existing multimedia assets so that they can be readily reused.

Existing techniques for managing multimedia assets leave much to be desired. Often, the management of multimedia assets is done manually. The cost of manual techniques becomes prohibitive as the volume of multimedia assets continues to increase. There has been some use of database management systems to store certain multimedia assets. However, existing systems have shortcomings.

Accordingly, improvements are needed in multimedia asset management. As described in detail below, the present invention provides an effective multimedia asset management system.

SUMMARY OF THE INVENTION

The present invention discloses a method, apparatus and article of manufacture for computerized management of multimedia assets. Check-in, search, and check-out operations are included. Various types of multimedia assets such as image (scanned photographs or computer-generated images), video (created by videography equipment or computer animation), audio, text, program code, etc. media types can be checked into a computer system. Previously checked-in multimedia assets can be searched for on the computer system, and selected multimedia assets can be checked out of the computer system.

The check-in of a multimedia asset includes prompting a user for characteristics and identification information for the multimedia asset. The multimedia asset, along with any specified characteristics and identification information, is stored in a database contained on a storage device.

The user can initiate a search for previously checked-in multimedia assets. A search includes prompting the user for a search strategy based on one or more asset characteristics and asset identification information. The computerized system searches the database for multimedia assets that satisfy the user-specified search strategy. Any multimedia assets found to satisfy the search strategy are reported to the user.

The user can selectively check-out multimedia assets contained in the database of checked-in multimedia assets. The check-out operation includes prompting the user for the multimedia asset to be checked out and prompting the user for one of multiple check-out types. The computerized system makes a determination as to whether or not the user-specified check-out is allowed based on predetermined criteria. If the check-out is allowed, the multimedia asset is copied for use by the user and an indication of the check-out and the type of check-out is stored in the database.

According to further aspects of the invention, the computerized system allows the user, upon his/her request, to preview a selected multimedia asset contained in the database. According to other aspects of the invention, the computerized management system is implemented in a client-server computer architecture.

According to further aspects of the invention, the multiple check-out types include first, second and third check-out types. A multimedia asset checked out with the first check-out type specified cannot be modified. A multimedia asset checked out with the second check-out type specified can be used as a basis for creating another multimedia asset. If the third check-out type is specified, the multimedia asset so checked out can be modified and subsequently checked into the database in modified form.

According to still further aspects of the invention, according to the predetermined check-out criteria, a check-out of a selected multimedia asset is prohibited if the third check-out type is specified and the selected multimedia asset is presently checked out. Additionally, the check-out of a selected multimedia asset is prohibited if the selected multimedia asset is already checked out with the third check-out type specified.

The invention includes many more features and advantages which are pointed out in the drawings, accompanying descriptive matter, and the claims annexed hereto.

BRIEF DESCRIPTION OF THE DRAWINGS

Referring now to the drawings in which like reference numbers represent corresponding parts:

FIGS. 8–5 show check-in user interface screens formed in accordance with the invention;

DETAILED DESCRIPTION OF A PREFERRED EMBODIMENT

I. System Overview

Figure 1:
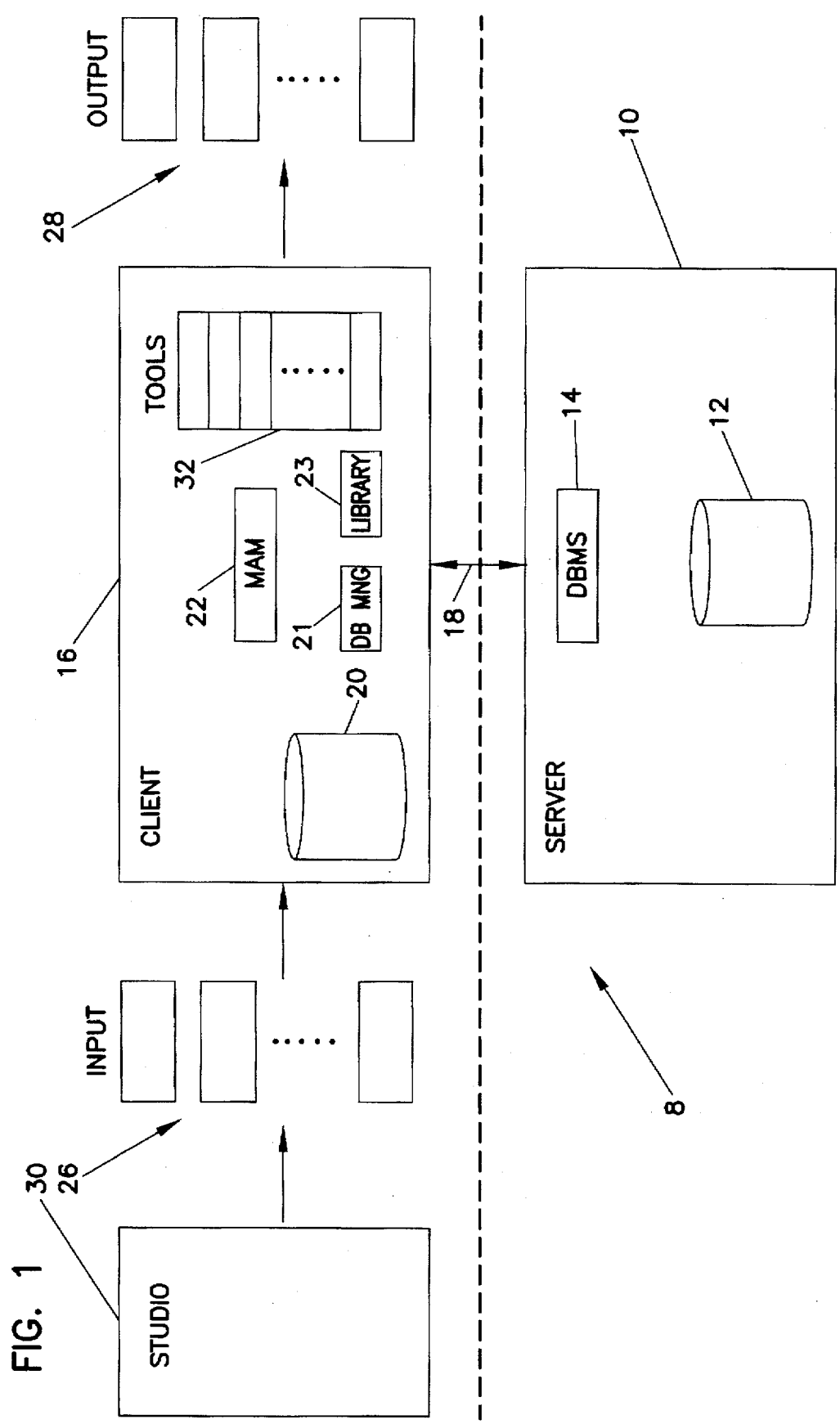
FIG. 1 is a block diagram representation of a multimedia asset management system formed in accordance with the present invention.

The block diagram in FIG. 1 depicts a preferred implementation of the multimedia asset management system 8 provided by present invention. The depicted computer system is configured in a client-server architecture. A server computer 10 is used to store and provide access to multimedia assets. The multimedia assets are stored on a storage device 12, which forms part of the server 10. A database management system software program 14 is used by the server 10 to store and provide access to the multimedia assets in a database on the storage device 12.

One or more client computers 16 provide multimedia assets to the server 10 for storage thereon. The client computers 16 can then obtain copies of selected multimedia assets stored on the server 10. Clients 16 are coupled to the server 10 by way of a local area network or, for more remotely located clients, by way of a wide area network, both generally depicted in FIG. 1 as communications network 18. Each client 16 has a local storage device 20 that stores software and data used by the client 16. The storage device 20 also stores copies of selected multimedia assets stored on the server 10.

A multimedia asset management program 22 manages and controls access to multimedia assets contained on the server 10 in accordance with the present invention. The multimedia asset management program 22 allows multimedia assets to be checked into the server 10; allows searching of multimedia assets stored on the server 10; allows selected multimedia assets to be checked out of the server 10; and provides other functions, as explained in greater detail below. A developer can use client computer 16 to create multimedia applications. Using the client 16 in conjunction with the multimedia asset management program 22, the developer can incorporate existing multimedia assets stored on the server 16 into new multimedia applications. The developer can also create new multimedia assets using the client computer 16. The new multimedia assets can be incorporated into multimedia applications, and can be stored on the server using the multimedia asset management program 22.

The multimedia asset management program 22 obtains access to the server 10 by way of a software library of application interface (API) functions 23. Specifically, the multimedia asset management program 22 interacts with the database management program 14 on the server by way of API function calls to obtain access to the database of multimedia assets on the storage device 12. The client 16 also includes a database management tool 21 that allows a system manager to manually modify the server database on the storage device 12.

Various input devices 26 allow an operator to control and interact with the client computer 16. The input devices 26 can include a keyboard, mouse, disk drive, and other input devices. The client 16 also includes output devices 28, including, for example, a display monitor, speakers, a printer, and other output devices. A system user can use the input devices 26 to load new multimedia assets into the client 16 and check the multimedia assets into the server 10 by way of the multimedia asset management program 22. The client 16 can be coupled to a studio 30 that is used to create multimedia assets, e.g., photographs, videos, audio segments, etc. The multimedia assets created via the studio 30 can be loaded into the client 16 by way of one or more of the input devices 26. The user can preview (i.e., perceive by way of the visual, audio or other senses) stored multimedia assets by way of the output devices 28.

The client 16 also includes one or more multimedia development tools 32, i.e., computer software programs. The development tools 32 can include content development tools for creating individual multimedia assets, such as images and animation. The development tools 32 can also include application development tools, i.e., software development tools.

A windows-type operating system, such as Windows NT or Windows 95 from Microsoft Corporation, is preferably used on the client computer 16. The multimedia asset management program 22 provides a series of user interface screens (i.e., windows or dialog boxes) that allow a user to utilize the multimedia asset management system 8 via the client 16.

Figure 2:
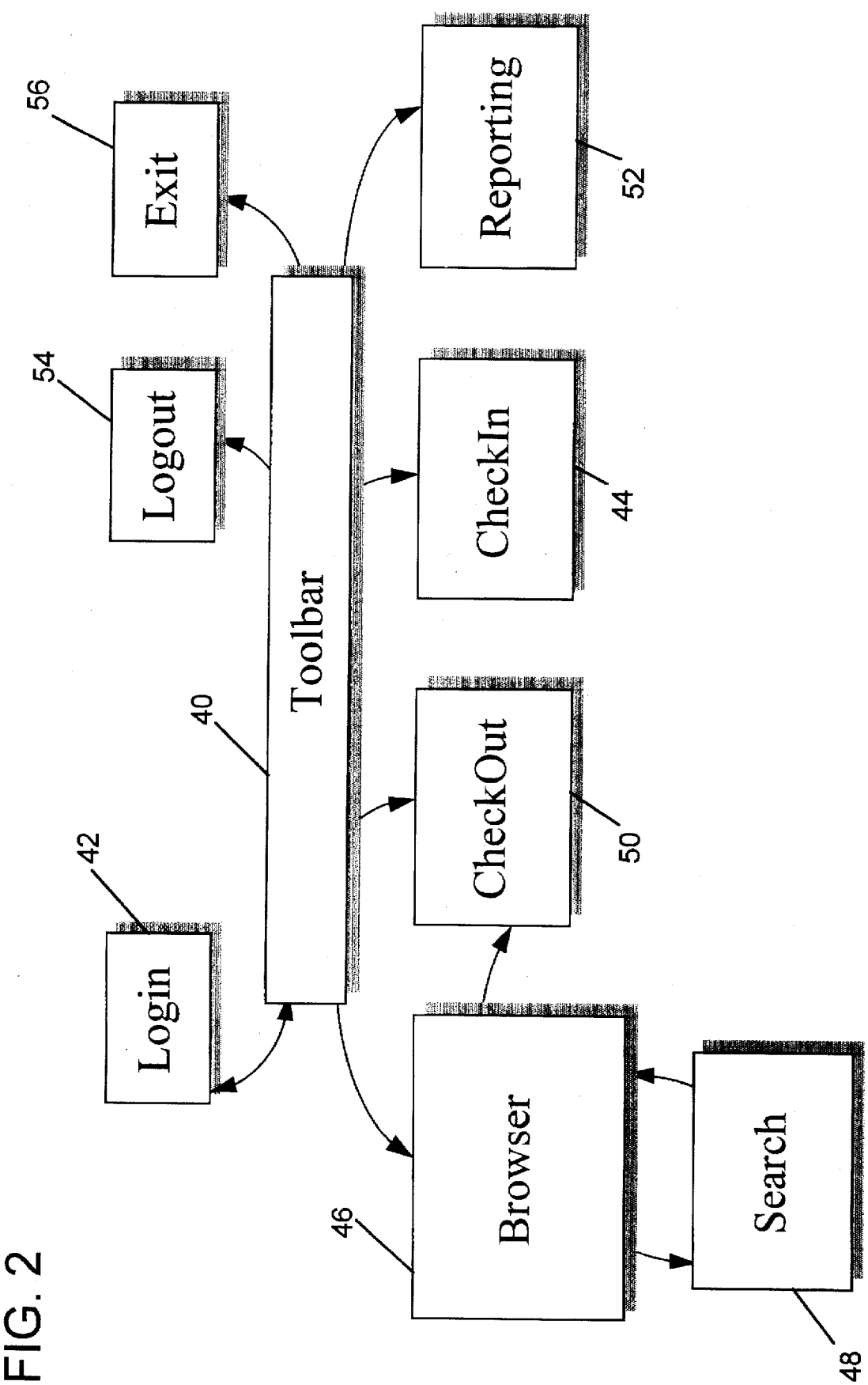
FIG. 2 is a block diagram representation of the user-interface screens and corresponding functions provided by the invention.

FIG. 2 is a block diagram generally depicting many of the user interface screens and corresponding functions provided by the multimedia asset management program 22. The user interface screens are depicted in greater detail in later figures. The multimedia asset management program 22 provides central access to its various functions by way of a toolbar window 40. The toolbar 40 appears when the multimedia asset management program 22 is first started.

From the toolbar 40, the operator can select one of various functions represented by the other blocks in FIG. 2. The operator can log into the multimedia asset management system byway of a login user interface screen 42. Once logged in, the operator can check-in multimedia assets into the multimedia asset management system 8 by way of a check-in user interface screen 44. The operator can search for selected multimedia assets previously checked into the multimedia asset system by way of a browser user interface screen 46 and a search user interface screen 48. The browser user interface screen 46 also allows the operator to preview selected multimedia assets using one or more of the output devices 28.

From either the toolbar display screen 40 or the browser display screen 46, the operator can gain access to the check-out user interface screen 50 to check-out selected multimedia assets. The operator can obtain various reports concerning the multimedia assets management system by way of a reporting user interface screen 52. The operator can logout of the multimedia asset management system by way of a logout user interface screen 54. The multimedia asset management program 22 is terminated by way of a exit user interface screen 56. Further functions accessed by way of the toolbar display screen 40 are described below.

II. Database Structure

Figure 3:
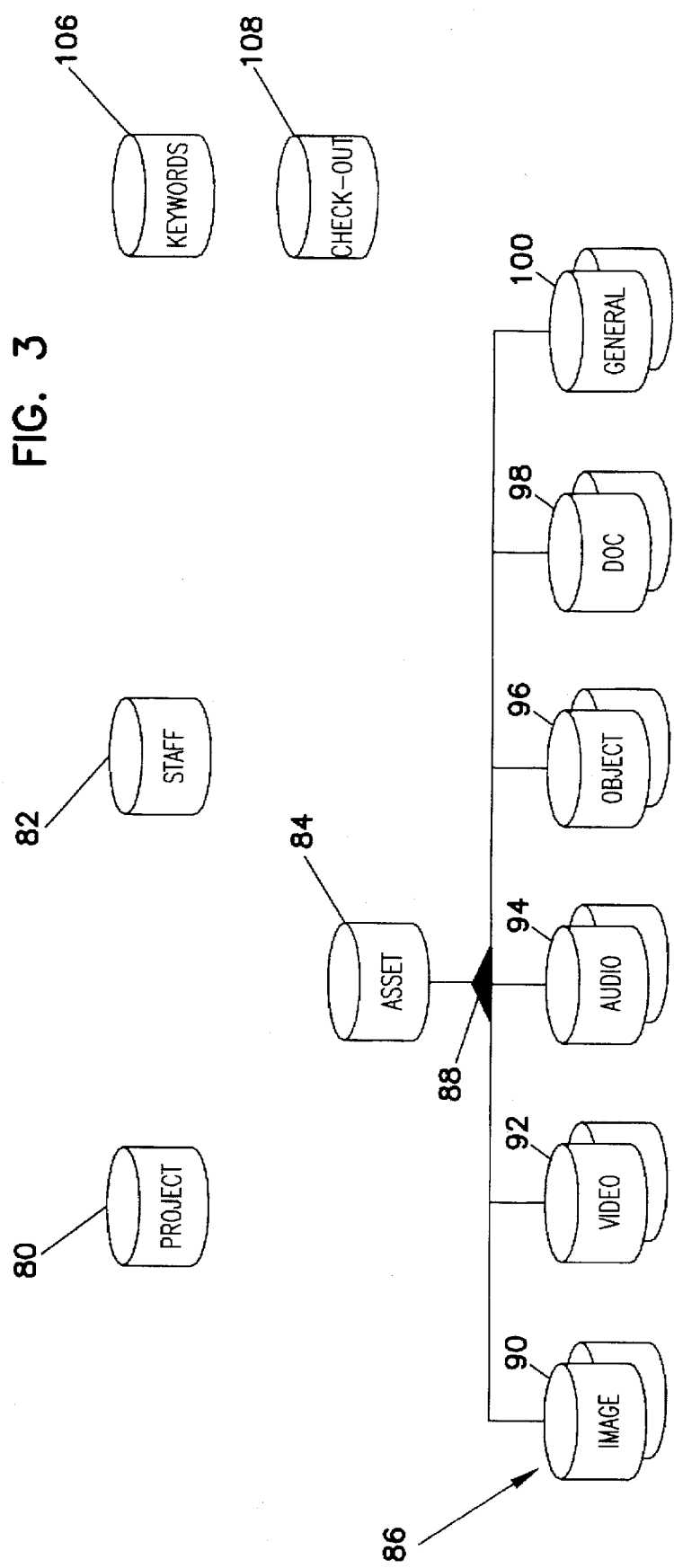
FIG. 3 is a block diagram of a database structure formed in accordance with the invention.

Prior to describing the user interface screens in greater detail, the database structure of the multimedia asset management system will be described. The database management system 14 in the embodiment being described is a hybrid object-oriented, relational database management system. The structure of the database stored on the storage device 12 is depicted in FIG. 3. The database is structured around a project table 80 ("mmf_project"), a staff table 82 ("mmf_staff"), and asset tables 86 for each asset type.

There is a record (or entry) in the staff table 82 for each user with access to the multimedia asset management system 8. Each multimedia application developed using the multimedia asset management system is associated with a project. There is a record in the project table 80 for each project. Assets are stored or assigned on a project basis. There is an asset table 84 ("mmf_asset") that defines the common data structure that is shared by all asset types. Specific asset-type tables 86 inherit the structure and behavior of the asset table 84, i.e., are subclasses of the asset table 84. No asset entries are made in the asset table 84. Rather, entries are made in the specific asset-type tables 86. There are multiple tables of each subclass table type 86; one table of each type for each project.

The specific asset-type tables 86 for each project are as follows. There is an image table 90 ("mmf_<p>_image") which is used to index computer-created images and scanned images such as photographs. The notation <p> refers to the project short name. As is the case for the other tables 86, there is an image table 90 for each project. For each image for a specific project, an entry (or record) is made in the image table 90 for that project.

A video table 92 ("mmf_<p>_video") is used to index full motion video created using videography equipment or by way of computer animation. An audio table 94 ("mmf_<p>_audio") is used to index audio segments created by audio equipment or by computer. An object table 96 ("mmf_<p>_appl_obj") is used to index application code (i.e., executable code).

There is also a document table 98 ("mmf_<p>_doc") for each project for indexing general documents, such as text files. A general table 100 ("mmf_<p>_general") exists for each project to store new file types not covered by one of the other specific asset type tables 86.

As previously mentioned, each of the specific asset type tables 86 inherits from the asset table 84, so that the data structure of an entry (or record) in one of the specific asset-type tables 86 includes the fields defined by the asset table 84 (i.e., inherited fields) and the further fields defined by the specific asset-type table 86. The inheritance is represented in FIG. 3 by the solid triangle 88.

The database structure includes two further tables as depicted in FIG. 3: a keywords table 106 "mmf_keywords"); and a chekc out table 108 ("mmf_checked_out_assets") to store category-keywords pairs, which can be specified when checking in assets and then for later searching of assets, as described in detail herein after. A system manager can add and remove entries in the keywords table 106 by way of the database management tool 21. An entry is made in the checkout table 108 each time an asset is checked out. Each such entry in the checkout table 108 is removed when the corresponding asset is checked back in.

Each of the tables shown in FIG. 3 defines a specific data structure, comprised of multiple fields. Each entry (or record) in one of the tables has that data structure. Each data structure is described below in conjunction with a corresponding tabular listing of the fields of the data structure. In each tabular listing, the left-most column contains the field names. The second column from the left contains any restrictions on the field, indicated by the designations U, NN and X-REF. The designation U indicates that the field's contents must be unique from the contents of this field in other entries in the table. The designation NN indicates that the field must not be null. The designation X-REF indicates that the field provides a cross-reference to an entry in another table. The third column specifies the data type of the field, and the right-most column provides a brief description of the field.

The following tabular listing describes the data structure of each entry in the project table 80.

| | | mmf_project | |
|---|---|---|---|
| Field | Limits | Type | Description |
| name | U,NN | varchar(40) | Lowercase; no spaces - use underscore |
| description | NN | text | Project Description |
| manager | NN | varchar(8) | Project Manager (name should also exist in mmf_staff table) |
| short_name | U,NN | varchar(20) | Internal table name to use for the project |
| start_date | NN | timestamp_tz | |
| end_date | | timestamp_tz | |
| project_current | NN | boolean | Status flag ('T' if project currently going on). Default = T |
| archive_date | | timestamp_tz | |
| archive_info | | text | Archive storage information (DAT #, etc.) |
| charge_number | NN | char(15) | |
| common_project | NN | boolean | Set to True if project is a common project. |
| asset_table_oid | | set of (OID) | OID's of project asset tables |

The "name" field contains the assigned name for the project, up to 40 characters in length. The "description" field is a textual description of the project. The "manage" field identifies the manager assigned to the project. The "short_name" field is the project short name, which is the internal table name to be used for the project, i.e., the character string <p> of the asset-type tables 86. The "start_date" and "end_date" fields respectively contain the starting and ending time and date of the project. The "project_current" field indicates whether the project is currently active. When the project tables are archived, the "archive_date" field contains the time and date the project was archived, and the "archive_info" field contains a textual description of the archive, e.g., the medium on which the archival was made. The "charge_number" field can be used to store the billing number for the project. The "common_project" field indicates whether or not the project is a common project. Any user can search for and preview assets contained in projects designated as common projects. However, as with non-common projects, only users assigned to a common project can check assets in and out of the project. The "asset_table_OID" field contains a list of pointers (object identifiers OID's) to the asset tables 86 for this project.

There is an entry in the project table 80 for each multimedia project, each entry having the above data structure.

Additionally, in the embodiment being described, it is envisioned that there will be three background-type projects indexed in the project table 80. These background-type projects comprises a "common_media" project, a "common_applications" project, and a "factory_management" project. As with other projects, users are given access to one or more of these background-type projects by having a reference to the project in the user's record in the staff table 82, as described in greater detail below. The "common_media" project points to asset tables 86 of common multimedia assets to which most system users will have access. The "common_applications" project points to asset tables 86 of common applications and documents (e.g., application development tools and documentation) that multimedia application developers should have access to. The "factory_management" project points to asset tables 86 of system management assets, primarily system management documents, to which system management staff should have access.

Next, in conjunction with the below tabular listing, the data structure for the staff table 82 will be described.

| mmf_staff | | | |
|---|---|---|---|
| Field | Limits | Type | Description |
| user_id | U,NN | varchar(8) | User id (lowercase) |
| name | U,NN | varchar(30) | Full Name |
| description | NN | text | Additional information |
| assigned_projects | X-REF | setof(varchar(20)) | List of currently assigned projects (project short names; should also exist in mmf_project). |
| user_level | | varchar(30) | Classification of the user (Developer, Designer, Manager, and Administrator). Default = Developer |
| login_status | | boolean | Current user login status flag |

There is an entry (each having the above data structure) in the staff table 82 for each user of the multimedia asset management system 8. The "user_id" field contains the user identification name assigned to a particular user having access to the multimedia asset management system 8. The database management system 14 on the server 10 also stores the user identification names along with user passwords in an internal table. The "name" field contains the full name of the user. The "description" field contains textual information regarding the user.

The "assigned_projects" field contains a list of projects to which the user is assigned. Each project name must correspond to one of the short names ("short_name" field) in the entries in the project table 80. The short name of each project the user is to have access to is contained in the "assigned_projects" field. Thus, if the user is to have access to one or more of the "common_media," "common_applications," or "factory_management" projects, the short names of these projects would be contained in the "assigned_projects" field. The "user_level" field contains a classification of the user: developer, designer, manager or administrator. The "login_status" field contains an indication as to whether the user is currently logged in.

Next, the checkout table 108 is described with reference to the following tabular listing of the data structure of this table.

| mmf_checked_out_assets | | | |
|---|---|---|---|
| Field | Limits | Type | Description |
| asset_oid | U,NN | oid | OID of checked out asset |
| user_oid | U,NN | oid | OID of user who checked out the above asset |
| check_out_type | NN | text | Type of check out: CO_USE_AS_IS, CO_UPDATE, CO_USE_AS_BASIS |
| check_out time | NN | timestamp_tz | Time of check out |

Each time a multimedia asset is checked out, an entry is added to the check-out table 108. When the asset is subsequently checked back in, the entry for that asset is removed from the check-out table 108. The "asset_oid" field points to the multimedia asset 86 checked out. The "user_id" contains a pointer to the entry in the staff table 82 corresponding to the user who checked out the multimedia asset. The "check_out_type" field contains a text string indicating the type of check-out: use-as-is, update, or use-as-basis, as described in greater detail hereinafter. The "check_out_time" field contains a time and date stamp indicating the time of the check-out.

The data structure of the keywords table 106 is depicted in the following tabular listing.

| mmf_keywords | | | |
|---|---|---|---|
| Field | Limits | Type | Description |
| category | U,NN | text | Lowercase; no spaces - use underscore. Pair Unique with keyword. |
| keyword | U,NN | text | Lowercase; no spaces - use underscore |
| owner | NN | varchar(8) | User id of person who entered keyword |

For each keyword there is an entry in the keywords table 106. Each keyword is stored in a particular category. The "category" field is a text string identifying the category of keywords in which the keyword falls. The "keyword" field is a text string containing the particular keyword. The "owner" field contains the user identification name of the user who entered the keyword. As mentioned above, a system manager makes, removes and modifies entries in the keyword table 106 by way of the database management tool 21 on the client 16.

Next, the asset table 84 is described in conjunction with the following tabular listing of the asset table data structure.

| mmf_asset | | | |
|---|---|---|---|
| Field | Limits | Type | Description |
| name | U,NN | varchar(30) | Lowercase; no spaces - use underscore |
| filename | U,NN | varchar(36) | Asset's filename. |
| description | | doc | Lengthy description of asset |
| keywords | | doc | Each keyword should exist in keyword table |
| asset_type | NN | text | Type of asset. |
| creation_date | NN | timestamp_tz | Default = current time |
| creator_id | NN | varchar(8) | |
| modified_date | | timestamp_tz | Date of last modification |

-continued

| mmf_asset | | | |
|---|---|---|---|
| Field | Limits | Type | Description |
| modified_by | | varchar(8) | User id of last person to modify asset |
| time_to_modify | | numeric(6, 1) | |
| current_modify_by | | varchar(8) | User id of person currently modifying asset (NULL if asset has not been checked out for modification) |
| replace_count | NN | numeric | Sequential count of modifications. Incremented when asset is replaced. Default = 0. |
| usage_count | | numeric | Incremented each time the asset is checked out. Default |
| basis_asset | | oid | Oid of basis asset |
| children | | setof(oid) | Oid's of all assets that use this asset as a basis_asset. |
| consists_of | | setof(oid) | Oid's of all assets used in this asset (except basis oid) |
| copyright | | text | Copyright for this asset. Null if no copyright. |
| copyright_info | | text | Contact for payment or other copyright information |
| time_to_create | | numeric(6,1) | Time it took to create asset (Hours to nearest tenth) |
| add_chg_desc | | doc | Changes made from previous version of asset. |

As previously indicated, no entries are made in the asset table 84. Rather, the specific asset-type tables 86 inherit the data structure of this table and multimedia assets are entered by way of the specific asset-type tables 86. The above data structure defines the fields contained in all asset tables 86. Asset-type specific fields are defined by each of the specific asset types 86. The "name" field contains the name of the multimedia asset. The "filename" field contains the name of the file in which the multimedia asset was originally contained. The file is deleted once the asset is checked in. When the asset is subsequently checked out, a copy of the asset is stored on the client 16 in a file of this name.

The "description" field contains a description of the asset. The "keywords" field contains a listing of the keywords assigned to the multimedia asset. The "asset_type" field identifies the asset type: image, video, audio, appl_obj, doc, or general. The "creation_date" field contains a time and date stamp for the asset; the default is the current time and date. The creator of the asset is identified in the "creator_id" field. The time and date of the last modification of the asset is contained in a "modified_date" field, and the person who made the last modification is identified in the "modified_by" field. The "time_to_modify" field contains the time it took to make the last modification of the asset, rounded to the nearest tenth. If the asset is currently checked out for modification by a particular user (i.e., CO_UPDATE checkout type), the user is identified in the "current_modify_by" field. This field is NULL if the asset is not currently checked out for modification.

The "replace_count" field contains a count of the number of modifications made to the asset. The count is incremented by one each time the asset is checked in with modifications. Once the replace count reaches five, no further modifications are allowed to this asset. Instead, the user then creates a new asset. The "usage_count" field contains a count of the number of times the asset has been checked out. The usage count is incremented by one each time the asset is checked out.

If the asset was created using another asset as the basis for the asset, as described in greater detail below, the "basis_asset" field contains a pointer to the asset that served as the basis. The "children" field contains a list of pointers to assets created using this asset as a basis. The "consists_of" field contains a list of pointers to the assets used to create this asset, excluding the basis asset which is identified in the "basis_asset" field. Generally, the "consists_of" field lists assets used without modification in creating the asset; the "basis_asset" field identifies the asset, if any, used as a starting point, and subsequently modified, in creating the asset.

The "copyright" field contains text indicating the owner of any copyright in the asset. The field contains NULL if there is no copyright concerning the asset. The copyright identification in this field identifies the copyright in this particular work. Further copyright information may exist in the assets identified in the "basis_asset" field and the "consists_of" field. The "copyright_info" field contains text identifying the entity to contact for copyright information concerning the asset, e.g., a telephone number of the copyright owner. The "time_to_creat" field contains the number of hours, to the nearest tenth, it took to create the asset. The "add_chg_desc" field contains text describing the changes made from a previous version of this asset, if any.

The data structure of the image table 90 includes the just-described data structure of the asset table 84 plus the additional items shown in the following tabular listing.

| mmf_image (subclass) | | | |
|---|---|---|---|
| Field | Limits | Type | Description |
| image_object | U,NN | ImgDesc | Image |
| snapshot | | ImgDesc | Thumbnail for image up to 75 × 75 BMP format |
| format | NN | text | Image format (BMP, GIF, PCX, etc.) |
| size | | numeric | Image size |
| width | | numeric | Image width |
| height | | numeric | Image height |
| resolution | | text | Image resolution |
| bitdepth | | numeric | Image bitdepth |
| palette | | text | Palette associated with this image |

The "image_object" field contains the actual image. The "snapshot" field contains a thumbnail for the image in bit mapped format, e.g., for an icon. The "format" field contains text identifying the format of the image, e.g., BMP, GIF, PCX, or others. "Size," "width," and "height" fields contain respectively the image size, width and height. The "resolution" field identifies the resolution of the image. The "bitdepth" field identifies the image bitdepth, e.g., 8 or 16 bit. The "palette" field identifies the color palette associated with this image.

The additional fields added by the video table 92 are shown in the following tabular listing.

| | | mmf_video (subclass) | |
|---|---|---|---|
| Field | Limits | Type | Description |
| video_object | U,NN | large object | Video |
| frame_rate_fps | | numeric | Video frame rate (frames per second) |
| format | NN | text | Video format (SGI, QT, INDEO, MPEG, etc.) |
| size | | numeric | Video size |
| width | | numeric | Video width |
| height | | numeric | Video height |
| compression | | text | Type of compression |
| key_frames | | text | Key period |
| data_rate_kps | | numeric | Video rate |
| audio_type | | text | Type of associated audio (stereo or mono) |
| audio_freq_khz | | numeric | Sampling frequency (11, 22, 44 kHz) |
| audio_bitdepth | | numeric | Audio bitdepth (8 or 16-bit) |

The "video_object" field contains the actual video. The "frame_rate_fps" field contains the video frame rate in frames per second. The "format" field identifies the video format, e.g., SGI, QT, INDEO, MPEG, etc. The "size," "width," and "height" fields contain respectively the video size, width and height. The "compression" field identifies the type of compression, if any, of the video. The "key_frames" field contains textual information on the key period, i.e., conventional attribute description for digital video media types. The "data_rate_kps" field contains the digital bit stream rate. The "audio_type" field identifies the type of associated audio, e.g., stereo or mono. The "audio_freq_khz" contains the sampling frequency of the audio track(s) in the video, e.g., 11, 22 or 44 kHz. The "audio_bitdepth" field contains the audio bitdepth, e.g., 8 or 16 bit; the bitdepth indicates the number of bits used to represent a sampled value.

The additional data structure fields defined by the audio table 94 are tabulated in the following.

| | | mmf_audio (subclass) | |
|---|---|---|---|
| Field | Limits | Type | Description |
| audio_object | U,NN | large object | Audio |
| format | NN | text | Audio format (WAV, AU, VOC, etc.) |
| audio_type | | text | Audio type (mono or stereo) |
| size | | numeric | Audio size |
| sampling_freq_khz | | numeric | Sampling frequency (11, 22, 44 kHz) |
| bitdepth | | numeric | Audio bitdepth (8/16/32 bit) |

The "audio_object" field contains the actual audio. The "format" field identifies the audio format, e.g., WAV, AU, VOC, etc. The "audio_type" identifies the audio type, e.g., mono or stereo. The "size" field identifies the file size of the audio asset. The "sampling_freq_khz" field identifies the sampling frequency of the audio object, e.g., 11, 22 or 44 kHz. The "bitdepth" field identifies the audio bitdepth, e.g., 8, 16 or 32 bit.

The application object table 96 inherits the data structure defined by the asset table 84 and adds the following fields.

| | | mm_appl_obj (subclass) | |
|---|---|---|---|
| Field | Limits | Type | Description |
| application_object | U,NN | large object | application |
| launcher | NN | text | The name of the launching application |
| platform | | text | The platforms the application runs on |
| size | | numeric | Size of the application |

The "application_obj" field contains the executable code of the application that forms this asset. The executable code may be stored in compressed format. The "launcher" field contains the name of the application from which this application is launched, i.e., executed. The "platform" field identifies the platform, i.e., computer and operating system, on which the application runs. The "size" application identifies the file size of the application code.

The document table 98, which inherits from the asset table 84, adds the following fields.

| | | mmf_doc (subclass) | |
|---|---|---|---|
| Field | Limits | Type | Description |
| doc_object | U,NN | large object | Document |
| format | | text | Document format (PDF, DOC, RTF, PS, TeX, etc.) |
| size | | numeric | Document size |

The "doc_object" field contains the actual document that forms this asset. The "format" field describes the format of the document, e.g., PDF, DOC, RTF, PS, TeX, etc. The "size" field contains the size of the document.

The general table 100 also inherits from the asset table 84, and defines the following additional fields.

| | | mmf_general (subclass) | |
|---|---|---|---|
| Field | Limits | Type | Description |
| general_object | U,NN | large object | Asset content |
| format | | text | Descriptive file format |
| size | | numeric | Size of the file |

The "general_object" field contains the content that forms this asset. The "format" field describes the file format of the asset, and the "size" field contains the file size of the asset.

III. System Operation

Figure 4:
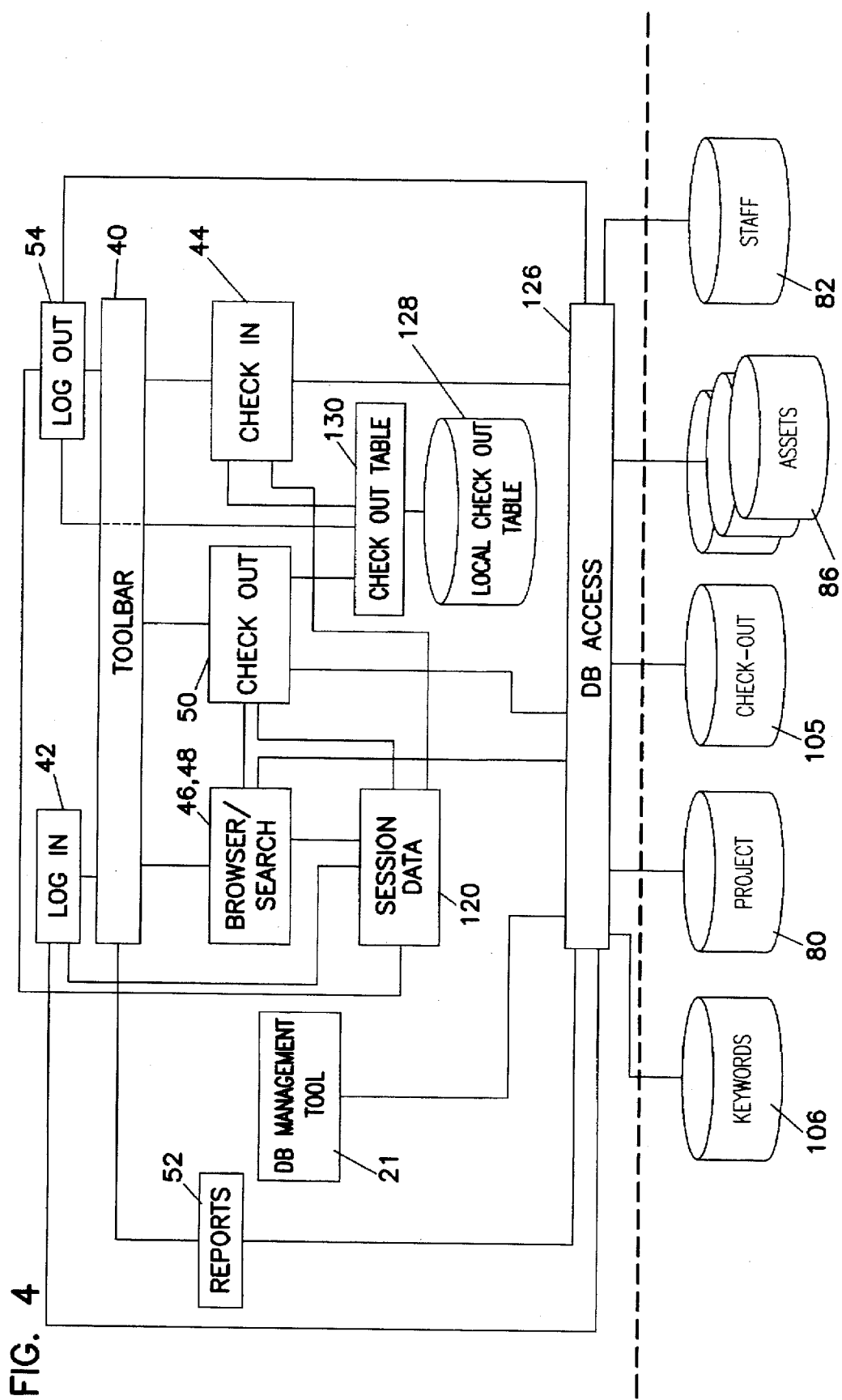
FIG. 4 is a blocked diagram representation of the interaction between software program components and database tables formed in accordance with the invention.

The operation of the multimedia asset system will now be described in greater detail in conjunction with the block diagram in FIG. 4 and the user interface screens depicted in FIGS. 5 through 19. The rectangular boxes, e.g., boxes 40, 42, and 44, in the block diagram of FIG. 4 represent operational components of the multimedia asset management system. In the embodiment being described, the multimedia asset management program 22 is programmed in an objected oriented paradigm, i.e., using an object-oriented programming language. The boxes shown in FIG. 4 can be implemented as objects and will be referred to as such herein. Many of the boxes shown in FIG. 4 also correspond to user interface screens of the multimedia asset management system. For such boxes, the same reference numeral is used to refer to the box and the corresponding user interface screen, e.g., the reference "toolbar object 40" refers to the software object and the reference "toolbar dialog box 40" refers to toolbar user interface screen shown in FIG. 5. Database tables are represented in FIG. 4 by cylinders, e.g., cylinders 80, 82, 86. The lines interconnecting the boxes and cylinders in FIG. 4 represent interaction between the software components and the passing of data.

The operation of the multimedia asset management system is centered about the toolbar object 40. The toolbar user interface screen 40 shown in FIG. 5 includes buttons 60–74 for accessing the various functions of the multimedia asset management program 22. Selecting one of the buttons, e.g., by a mouse, causes the multimedia asset management program 22 to display the user interface screen corresponding to the selected button. The "login/logout" button 60 is selected to access the login user interface screen 42 and the logout user interface screen 54. The "check-in" button 62 is selected to access the check-in user interface screen 44, and the "check-out" button 64 is selected to access the checkout user interface screen 50. By selecting the "browser" button 66, the browser user interface screen 46 is accessed, and from there the search user interface screen 48 can be accessed. The reports display screen is accessed by the "reports" button 68. The user initiates exiting from the multimedia asset management program 22 by selecting the "exit" button 70.

Figure 5:
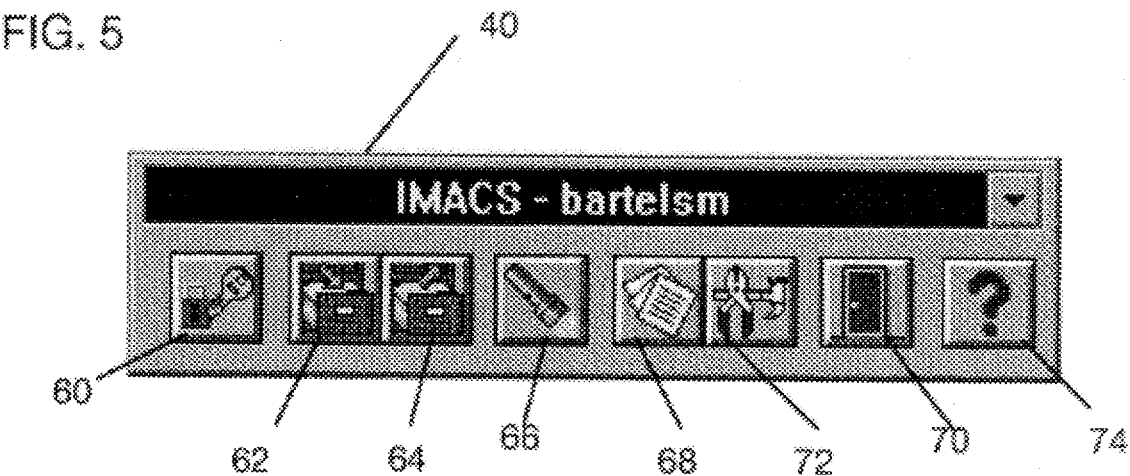
FIG. 5 shows a toolbar user interface screen provided by the invention.
Figure 6:
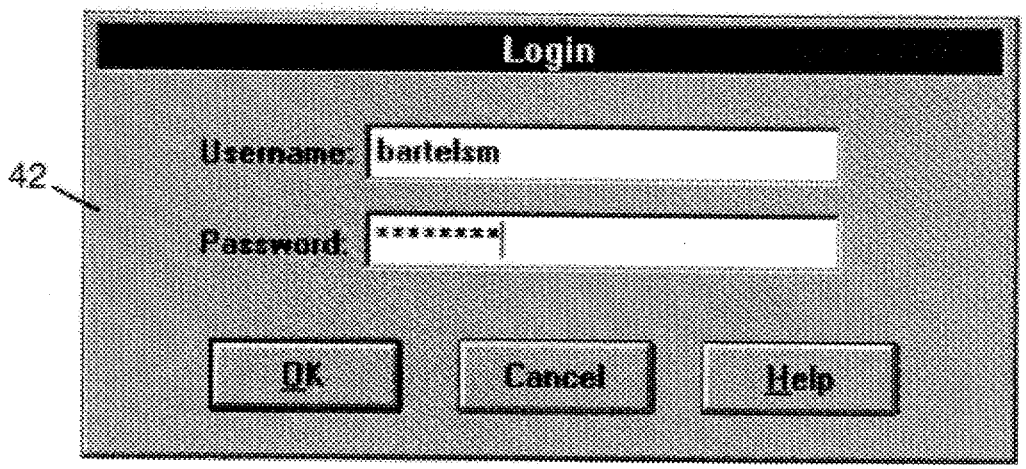
FIG. 6 is a login user interface screen according to the invention.

The toolbar 40 can also include other buttons, as illustrated in FIG. 5. FIG. 5 additionally depicts a "utilities" button 72, for accessing various utility-type functions of the multimedia asset management system 8. As explained in greater detail below, the user can change his/her password via the "utilities" button 72, and the user can check in all assets currently checked out with the use-as-is check-out type. Also depicted in FIG. 5 is a "help" button 74 for obtaining on-line help on using the multimedia asset management system.

At startup of the multimedia asset management program 22, only the "login/logout," "exit" and "utilities" buttons 60, 70 and 72 are enabled; the other buttons are disabled. Also on start up of the multimedia asset management system program 22, a session data object 120, depicted in FIG. 4, is created. The session data object 120 contains information regarding the system user, keywords, and other information, as explained in greater detail below.

A. Login

Now the functions of the multimedia asset management system, accessed by way of the toolbar window 40, will be described in greater detail. The action taken by the multimedia-asset management program upon selection of the "login/logout" button 60 depends upon whether or not the user is already logged in. If the user is not already logged in, the login dialog box 42 (shown in FIG. 6) is displayed. This is depicted in the block diagram of FIG. 4 by the line interconnecting the toolbar object 40 and the login object 42. The login dialog box 42 shown in FIG. 6 has a "user name" field in which a user enters his/her assigned user name. The login dialog box also has a "password" field in which the user enters his/her assigned password.

After entry of the user name and password, the user selects an "OK" button on the login dialog box 42 to attempt to login into the multimedia asset management system. Alternatively, there is a "cancel" button, the selection of which will cancel the login attempt. As with many of the other dialog boxes, there is also a "help" button which can be selected to obtain on-line help.

Upon selection of the "OK" button, the contents and size of the entries made in the "user name" and "password" fields are checked by the multimedia asset management program 22. If there are any problems, the program asks the user to re-enter the user name and/or password. The multimedia asset management program 22 obtains server and database information (in particular, server name, host name, port number and database name) from the session data object 120. Assuming the contents and size of the "user name" and "password" fields are acceptable, the multimedia asset management program 22 uses this information to attempt to form a connection with the server computer 10. The server 10 verifies the entered user name and password by comparison to an internal database of user names and passwords. If the multimedia asset management program is unable to form a connection to the server 10, an informative error message, e.g., incorrect password, is displayed, and the user is asked to re-enter his/her user name and password.

Once a connection is formed with the server 10, the multimedia asset management program 22 accesses the server database by way of the database access object 126 depicted in FIG. 4. The database access object 126 calls functions in the library of functions 23 to interact with the database management system 14 on the server 10 (not shown in FIG. 4).

The staff table 82 is interrogated for the record corresponding to the user, i.e., the staff table record whose "user_id" field contains the entered user name. This is depicted in FIG. 4 by the line interconnecting the login object 42 and the database access object 126. Once this record is found, the server 10 returns the list of projects to which the user is currently assigned (i.e., the list in the "assigned_projects" field). This information is stored in the session data object 120 along with other user information including the user identification name. If the "assigned_project" field contains no projects, i.e., has a NULL value, the multimedia asset management program toolbar dialog box 40 disables the check-in, check-out and reports buttons 62, 64 and 68. The search button 66 is not disabled because the user can search and preview assets contained in any of the common projects. The "login_status" field in the user's staff table record is set to reflect that the user is logged in.

The login object 42 interrogates the project table 80 for a list of common projects, i.e., project table records with the "common_project" field set. This information is also stored in the session data object 120. The login object 42 also obtains the list of keyword-category pairs stored in the keywords table 106. The keyword-category pairs are stored in the session data object. The login dialog box 42 is then closed and the toolbar dialog box 40 is returned to. A status is returned to the toolbar object 40.

B. Check-out

Once multimedia assets are checked into the multimedia asset management system, in the manner described below, the user can check out multimedia assets. The user launches the check-out procedure by selecting the "check-out" button 64 on the toolbar dialog box 40, shown in FIG. 5. This causes the check-out dialog box 50 shown in FIG. 7 to be displayed. The check-out object 50 obtains the user name from the session data object 120. The check out object 50 also obtains the list of projects assigned to this user from the session data object 120.

The user enters the name of the multimedia asset to be checked out in the "name" field of the check-out dialog box 50. The asset name should correspond to one of the names in the "name" field of the assets tables 86 stored on the storage device 12. Upon selection of the down-arrow adjacent the "project" field, the check-out dialog box lists the projects from which the user can check out assets. The list of projects corresponds to the list of projects assigned to the user, which is obtained from the session data object 120. The user selects one of these assigned projects.

The user specifies the type of asset to be checked out by selecting one of the radio buttons (audio, video, image, document, code or other) in the "type" panel of the check out dialog box 50. The buttons are "radio" buttons in that only one button can be selected, and if a new button is selected, the previously-selected button is de-selected. The user selects the check-out type by way of the "What do you plan to do with this asset?" panel of the check out dialog box 50. The user specifies one of three check out types: use as is; use as basis; or update/correct. If the user selects the "use as is" check out type, no modification of the asset is allowed. If the user selects the "use as basis" check out type, the user is allowed to create a new asset using the checked-out asset as the basis, i.e., the starting point. If the "update/correct" check-out type is specified, the user is allowed to modify the asset. The default check-out type is "use as basis."

The check out object 50 submits a query to the database access object 126, depicted in FIG. 4, to locate the user-specified asset and to determine whether the check-out is allowed. The database access object 126, in conjunction with the database management system 14 (FIG. 1), searches the specified asset-type table 86 for the specified project. If the asset cannot be found, the database access object 126 returns that status information to the check-out object 50, and the check-out object 50 reports that fact to the user. If the asset is found, the "current_modify_by" field of the asset is checked to determine if the asset is currently checked out for modification, i.e., checked out with the "update/correct" check-out type. If the asset is currently checked out for modification, no additional check outs of the asset are allowed. The database access object 126 reports this condition to the check-out object 50, which in turn reports this fact to the user.

Further verification of whether the check-out is allowed depends on the type of check-out specified. If the "use as is" check out type is specified, no further verification is needed. The database access object 126 copies the asset locally, i.e., to the storage device 20 on the client 16.

The check-out object 50 stores an indication of the check-out in a local check-out table 128 on the client computer 16, as depicted in FIG. 4. A unique local check-out table is used for each user. The multimedia asset management program 22 maintains the local check-out table 128 by way of a check-out table object 130. The local check-out table 128 comprises a file with an entry or record for each check-out. Each entry has the following fields: check-in data; asset OID; asset name; project; filename; asset type; check-out type; check-out date. The "check-in date" field is filled when the asset is checked back in. The "asset OID" field contains a pointer to the asset on the server computer 10 in the database management system 14. The "asset name" field is the name of the asset, i.e., in the "name" field of the asset record on the server 10. The "project" field contains the name of the project to which the asset corresponds. The "filename" field contains the file name assigned to the asset, i.e., the "filename" field of the asset record on the server 10. The "asset type" field contains the asset type, i.e., the "asset_type" field of the asset record on the server 10. The "check-out type" field contains the check-out type, i.e., CO_USE_AS_IS, CO_USE_AS_BASIS, or CO_UPDATE. The "check-out date" field contains the date the asset was checked out.

The check-out object 50 also causes an entry to be added to the check-out table 105 on the server. The fields of this previously described table are filled. For example, the "check_out_type" field is filled to represent the "use as is" check-out type (i.e., "CO_USE_AS_IS").

If the "use as basis" check out type is specified, the check-out object 50 similarly obtains a copy of the asset from the database access object 126 and the copy of the asset is stored locally on the client storage device 20. The check-out object 50 adds a record to the local check-out table 128 by way of the check-out table object 130. And, the check-out object 50 causes a record to be added to the server-side check-out table 105. The "check_out_type" field is set to represent the "use as basis" check-out type.

If the "update/correct" check-out type is specified, the check-out object 50 determines whether the asset is already checked out, by way of a call to the database access object 126. The database access object 126 causes the server 10, by way of the database management software 14, to check the server-side check-out table 105 to determine if this asset is checked out. If the asset is already checked out, regardless of the check-out type, the requested check-out is denied. The check-out object 50 informs the user of this condition and returns to the check-out window 50. On the other hand, if the asset is not currently checked out, the database access object 126 returns a copy of the asset for local storage at the client 16. The check-out object 50 adds an entry to the local check-out table 128 by way of the check-out table object 130 to reflect the check out. An entry is also made in the server-side check-out table 105 to reflect the check-out. The "current_modify_by" field of the asset's record on the server 10 is filled in with the user name.

Regardless of the check-out type, the following additional actions are performed. The "usage_count" field of the asset's record on the server 10 is incremented. Prior to storing the copy of the asset locally (i.e., on the client storage device 20), the check-out object 50 checks to see if a local file of the same name as the file name of the asset to be checked out (i.e., the "filename" field of the asset record) exists on the client. If so, the copy is not stored locally and the user is informed of the error. On the other hand, if the check-out is successfully completed, the user is informed of this result and the check-out dialog box 50 is closed and the toolbar dialog box 40 is again displayed. The toolbar 40 is also returned to if the "cancel" button on the check-out dialog box 50 is selected prior to successfully completing a check-out. The check-out dialog box 50 also has a "help" button from which on-line help can be obtained.

C. Check-In

Figure 8:
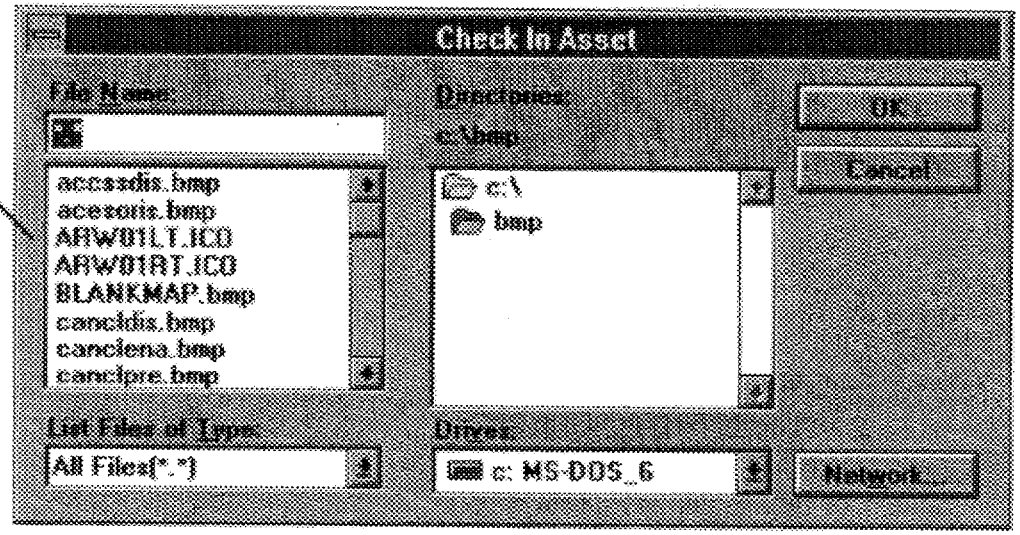

Next, the check-in procedure is described in conjunction with the block diagram in FIG. 4 and the check-in user interface screens shown in FIGS. 8–15. Upon user selection of the "check-in" button 62 on the toolbar 40, the check-in procedure is begun. The file check-in dialog box 44a shown in FIG. 8 is displayed. In this dialog box, the user specifies the path and name of the file containing the multimedia asset to be checked in. The file name is specified in a "file name" field and the file path is specified in directories and drives fields. The "network" button can be selected to select disk drives on different server computers. The user can specify a file format type, e.g., bit-mapped, using a "List File of Type" field to limit the files listed in the "file name" field. After the file has been specified, the user continues the check-in procedure by selecting the "OK" button. If the "cancel" button is selected, the check-in operation is aborted and the toolbar 40 is again displayed.

Upon selection of the "OK" button, the check-in object 44 determines whether the specified file corresponds to an asset that the user has checked out, by reviewing the local check-out table 128. If the file specified is an asset that is currently checked out with either the "use as is" or "use as basis" check-out types specified, the asset is checked in without further action by the user. The check-in object 44 (by way of the check-out table object 130) adds the current date to the "check-in date" field of the entry corresponding to this asset in the local check-out table 128, to reflect the check-in. The local check-out table entry is not removed at this time. Rather, each time the check-out table object 130 is called, the check-out table object 130 checks for records with a check-in date (i.e., in the "check-in date" field) more than a selected amount old (e.g., two weeks). Thus, records in the local check-out table 130 are not removed until after a certain period of time after the asset has been checked in. The check-in object 44 calls the database access object 126 to have the object checked back into the server 10. This comprises removing the entry corresponding to the check-out from the server-side check-out table 105. Then, the check-in object 44 returns control to the toolbar object 40, which once again displays the toolbar window shown in FIG. 5.

Figure 9:
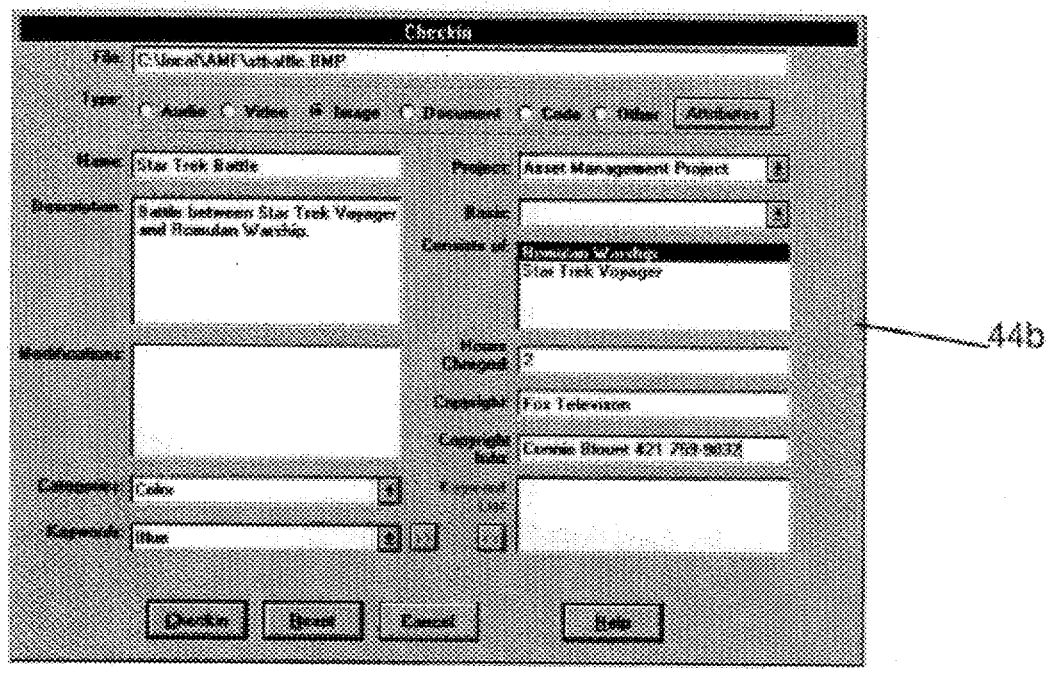

On the other hand, if the user-specified file name does not correspond to an asset that has been checked out as "use as is" or "use as basis" (i.e., this asset does not exist on the server or this is a modified or updated version of an asset on the system) the check-in dialog box 44b shown in FIG. 9 is displayed. The user specifies further details of the asset in the check-in dialog box 44b. The "file" field contains the file path and name that the user specified in the file check-in dialog box 44a. This field is not editable. The check-in object 44 obtains the user name, the list of assigned projects for this user and the list of keywords in the keywords table 106 from the session data object 120. The check-in object 44 reviews the local check-out table 128 and constructs a list of assets that the user has checked out with the "use as basis" check-out type. This list is used to prefill the "basis" field in the check-in dialog box 44b. The check-in object 44 also constructs a list of assets the user has checked out with the "use as is" check-out type. This list is used to prefill the "consists of" field in the check-in dialog box 44b. The list of assigned projects and list of keywords are used by the check-in object 44 to pre-fill, as possible selections, the "project," "categories," and "keywords" fields in the check-in dialog box 44b.

The check-in dialog box 44b includes a "type" panel having radio buttons for each of the possible asset types: audio, video, image, document, code or other. The user enters the full name of the asset in the "name" field. The user selects one of the projects listed in the "project" field. By way of the "basis" field, the user can select, from the list of assets, the asset, if any, that served as the basis for the asset being checked in. The list of possible basis include a NONE option. The NONE option should be selected if the asset has no basis. If a basis asset is specified the information for that asset, obtained from the server, is used to pre-fill the "consists of," "description," "keyword list," "copyright," and "copyright info" fields, as a starting point for the current asset. These fields can be subsequently modified by the user.

The "description" field is a scrollable text field in which the user can enter a description of the asset. The "modifications" field is also a scrollable text field. If the asset to checked in is a modified version of a previous asset, a description of the modifications can be entered here. Upon storage of the asset on the server 10, this modification information is placed in the "add_chg_desc" field of the record for this asset. If, in addition to the basis asset, one or more assets currently existing in the multimedia asset management system were used to create the asset to be checked in, those assets can be selected from the "consists of" field list.

The user can specify keywords for the asset by use of the "categories" and "keywords" fields. The user first selects one of the "categories" listed in the "categories" field. The check-in object 44 then obtains the keywords falling within this category from the session data object 120 which then provides a list of keywords in the "keywords" field. The user then selects one of the listed keywords and selects the adjacent "right arrow" button to have the keyword added to the "keyword list" field. In this manner, multiple keywords can be sequentially added to the "keyword list" field. To remove a keyword from the keyword list, the user selects the keyword in the "keyword list" field that the user wants to remove. The user then selects the "left arrow" button adjacent the "keyword list" field. Alternatively, the user can add or remove a keyword from the "keyword list" field by double-clicking on the keyword in the "keywords" field or "keyword list" field, respectively. The specified keywords will be added to the "keywords" field of the asset record on the server 10 upon check in.

The user can enter copyright information, such as the copyright owner, for the asset in the "copyright" field. The user can enter further copyright information, for example the contact person and telephone number, in the "copyright info" field. The user can enter the number of hours charged to create this asset in the "hours charged" field which is subsequently entered into the "time_to_create" field of the asset record on the server.

The user can select the "check-in" button, the "reset" button, the "cancel" button or the "help" button at the bottom of the check-in dialog box 44b. If the "check-in" button is selected, the check-in object 44 checks to see that the "name," "project," "basis" and "description" fields are not blank. If any of these fields are blank, the user is asked to complete the blank field. In the asset "type" panel, in which the asset type is specified, there is an "attributes" button. This button can be selected to define the attributes for the specific asset type, i.e., audio, video, image, document, code or other, as described below. If the user has not previously specified the asset attributes by selecting the "attributes" button, upon selecting the "check-in" button, the same attributes dialog box that would have been displayed if the "attributes" button was selected is displayed, so that the user can specify the asset attributes.

The check-in object 44 then calls the database access object 126 and passes the information specified in the check-in dialog boxes to the database access object 126. The check-in object 44 also passes a flag indicating whether this is a modification of a previously existing asset, in which case particular database fields are updated, as described in the following. The database access object 126 in turn causes the specified information to be stored in the appropriate asset table 86 on the server 10. If this is a completely new asset, a new record of the corresponding asset type is created and the fields for that record are filled with the specified information.

On the other hand, if this is a modified version of a previously existing record, the record for that asset is updated with the specified information and the "replace_count," "time_to_modify," "modified_date," "modified_by" and "current_modify_by" fields are updated. The check-in object 44 updates the local check out table 128 by adding the current date to the "check-in date" field for the asset. The entry in the server-side check-out table 105.corresponding to the previous check-out of the asset is removed.

After the check-in is complete, the multimedia asset management program informs the user of the result of the check-in, e.g., the check-in was successful. The check-in dialog box 44b is then closed, and the toolbar dialog box 40 is again displayed.

If, prior to completion of a check-in, the user selects the "reset" button in the check-in dialog box 44b, the check-in object 44 clears all information specified for the asset in the editable fields of the check-in dialog box 44b. On the other hand, if the user selects the "cancel" button, the check-in is aborted, and the toolbar dialog box 40 is again displayed. The user can obtain on-line help by selecting the "help" button.

The attribute dialog boxes for specifying the asset-type specific attributes are shown in FIGS. 10-15. It is not mandatory that asset type specific attributes be specified. Each of the fields in the attribute dialog boxes are editable text fields that the multimedia asset management program pre-fills to the extent possible. Each of the attributes dialog boxes shown in FIGS. 10-15 has: an "OK" button, which is selected after the attribute information has been completed to confirm the entered information; and a "reset" button, selection of which causes the attribute fields to be cleared.

Figure 10:
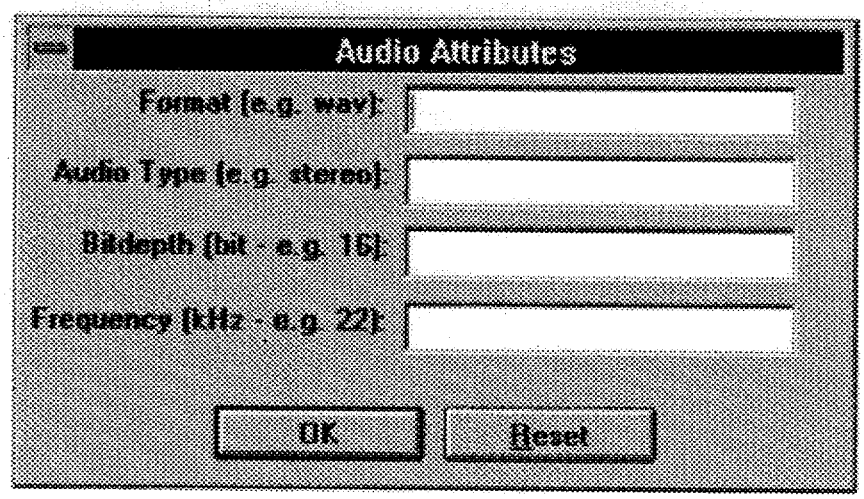
Figure 11:
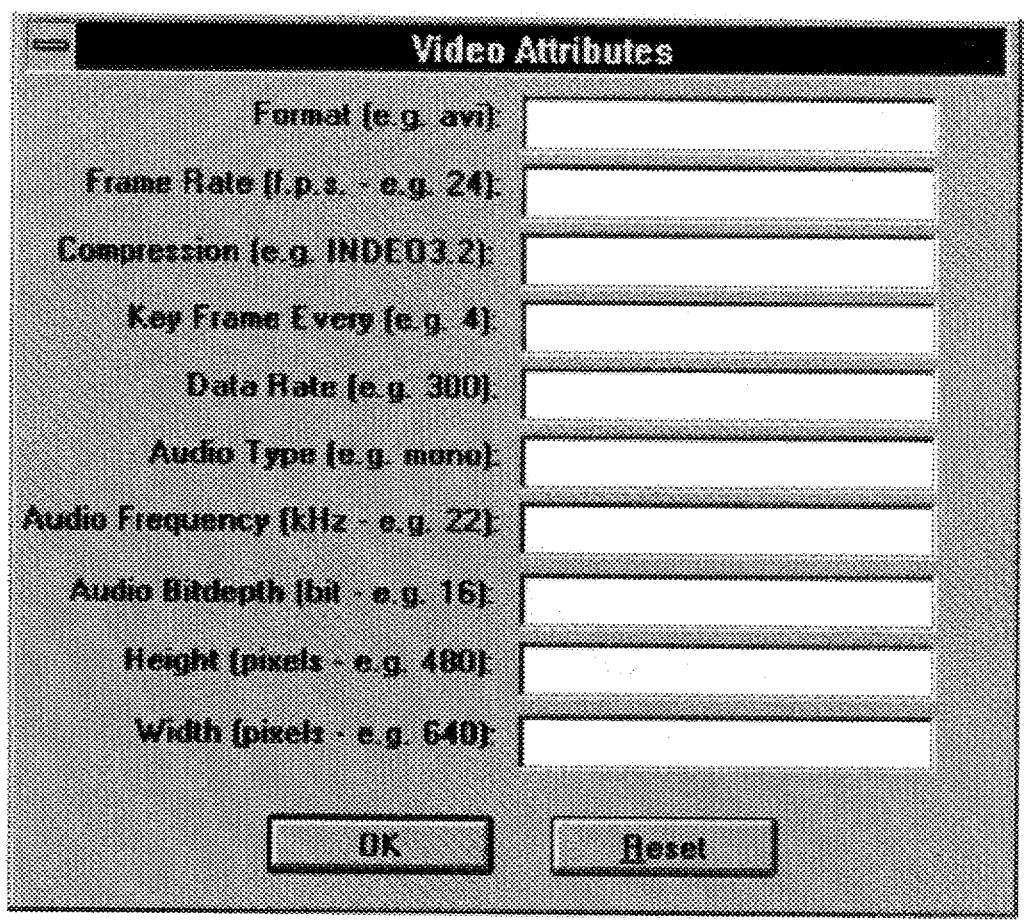
Figure 12:
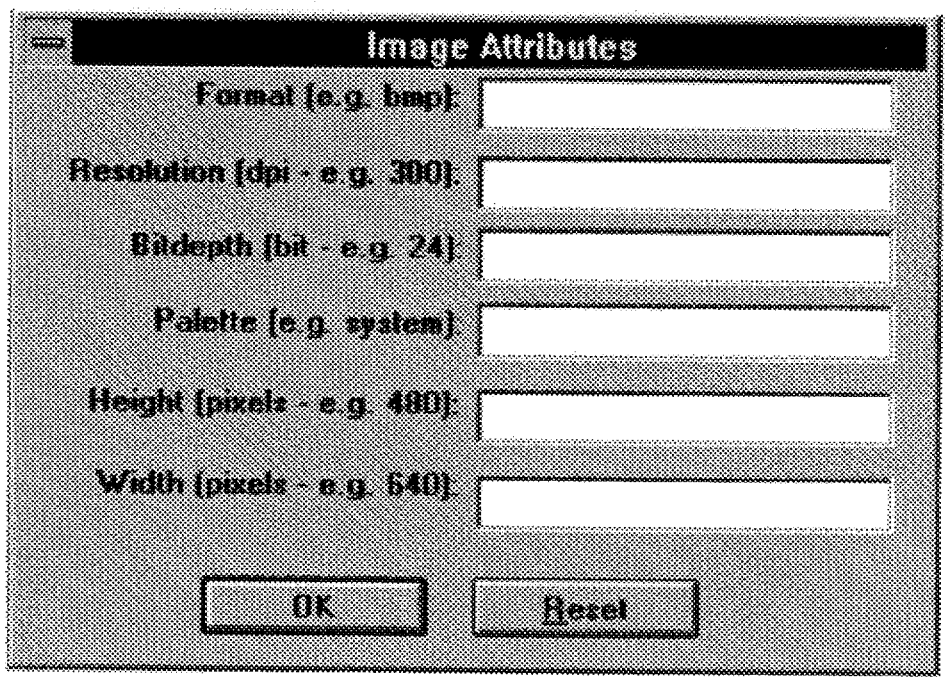
Figure 13:
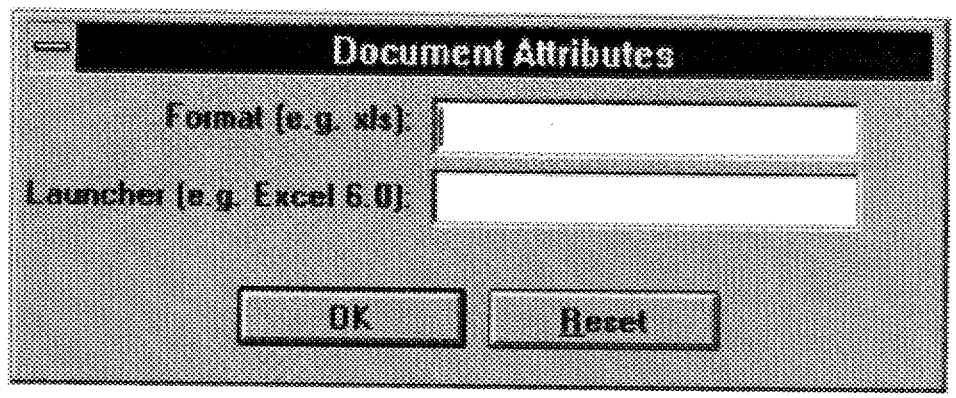
Figure 14:
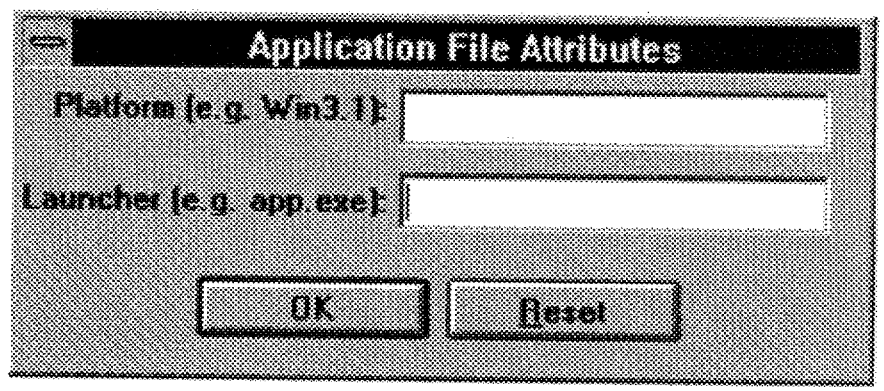
Figure 15:
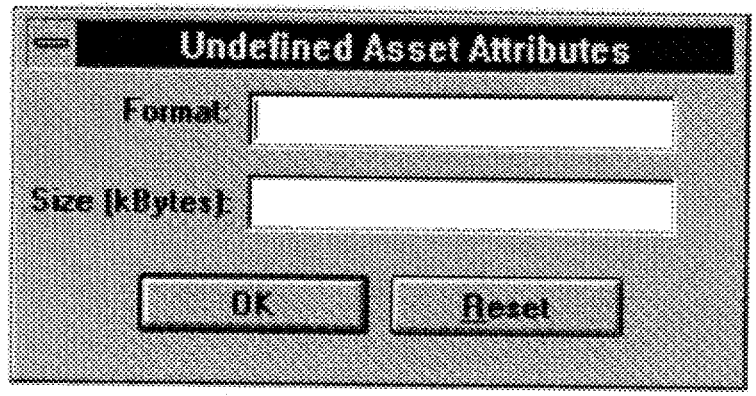

The attributes dialog box for audio-type assets is shown in FIG. 10. In this dialog box, the user can enter the format, audio type, bit depth and frequency of the audio asset. The video attributes dialog box is shown in FIG. 11. By way of this attributes box, the user can specify the video format, frame rate, compression, key frame period ("key frame every" field), data rate, audio type, audio frequency, audio bit depth, height, and width. FIG. 12 shows the attributes dialog box for image assets. The user can specify the image format, resolution, bit depth, pallet, height, and width. The attributes dialog box for document-type assets is shown in FIG. 13. With this dialog box, the user can specify the document format and the program that can be used to view the document (i.e., the "launcher" field). FIG. 14 shows the application file attributes dialog box, which is displayed for code asset types. The user can specify the platform for the application and the launcher program for the application. The attributes dialog box for other asset types is shown in FIG. 15, in which the user can specify the asset format and size.

D. Search/Browse

Figure 16:
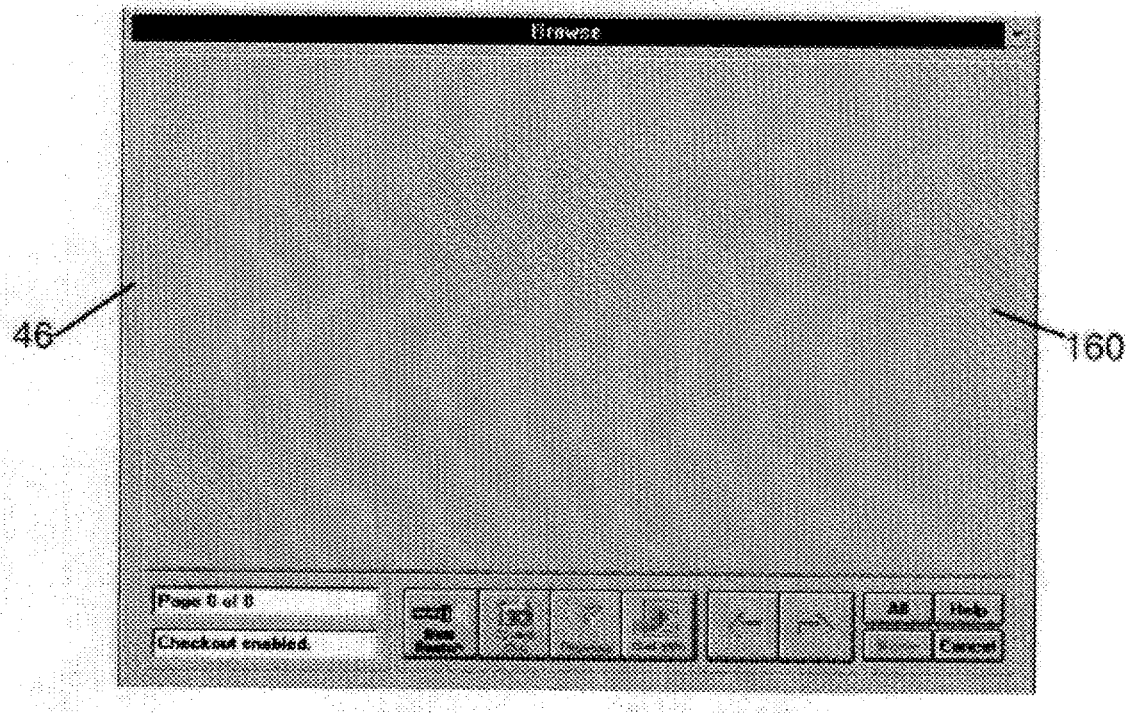
FIGS. 16, 16a and 16b show a browse user interface screen formed in accordance with the invention.

Returning now to the toolbar dialog box 40 shown in FIG. 5, if the "search/browse" button 66 is selected, the search/browse window 46 shown in FIG. 16 is displayed. On start up of the search/browse window 46, a results area 160 of the window is blank and all selectable buttons on the bottom of the window are deactivated except for the "new search," "cancel," and "help" buttons. Selection of the "cancel" button closes the search/browse window and returns control to the toolbar object 40, so that the toolbar dialog box is again displayed.

Figure 17:
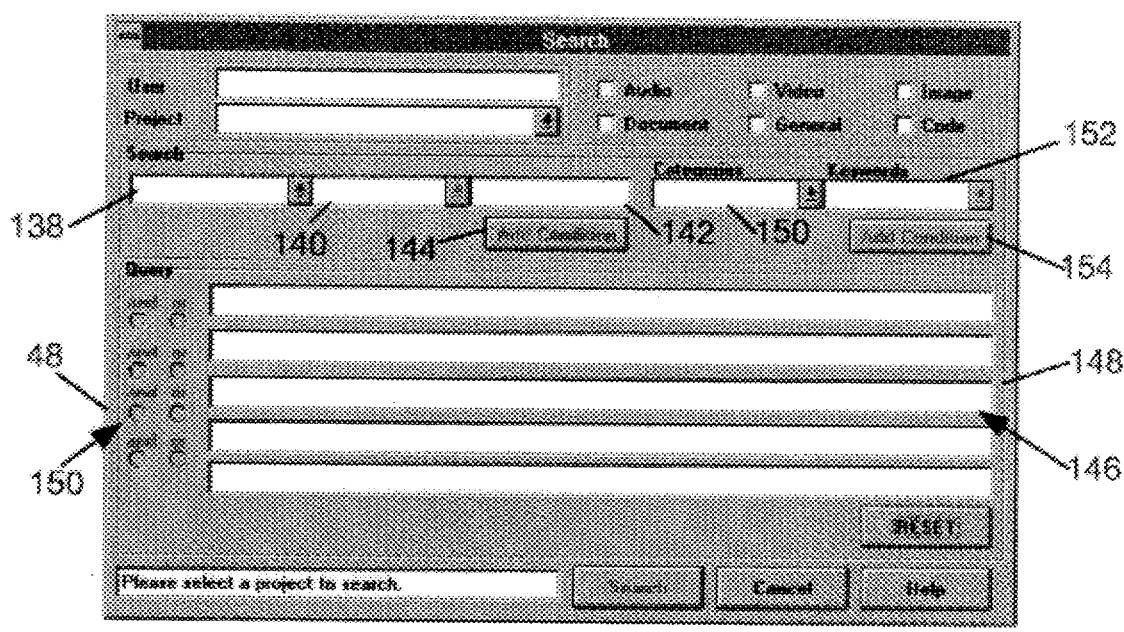
FIGS. 17, 17a and 17b show search user interface screens formed according to the invention.

Upon selection of the "new search" button, the search dialog box 48 shown in FIG. 17 is displayed. Through this dialog box 48, the user can specify a search for assets checked into the multimedia asset management system. On start up of the search dialog box 48, the name of the user is obtained from the session data object 120 and the name is filled into the "user" field on the search dialog box 48. The list of projects assigned to this user, the list of common projects, and the list of keywords and categories are obtained from the session data object 120. This information is used to pre-fill the "project" field and the "categories" field.

The "project" field is a non-editable field in which the user selects one of a list of projects to be searched. The list is an amalgamation of assigned projects and common projects, with duplicated project listings eliminated. The search dialog box 48 contains an asset-type check box for each of the asset types (i.e., audio, video, image, document, general, or code). The user can check one or more of these asset-type boxes to specify the type(s) of assets to be searched for.

Figure 17A:
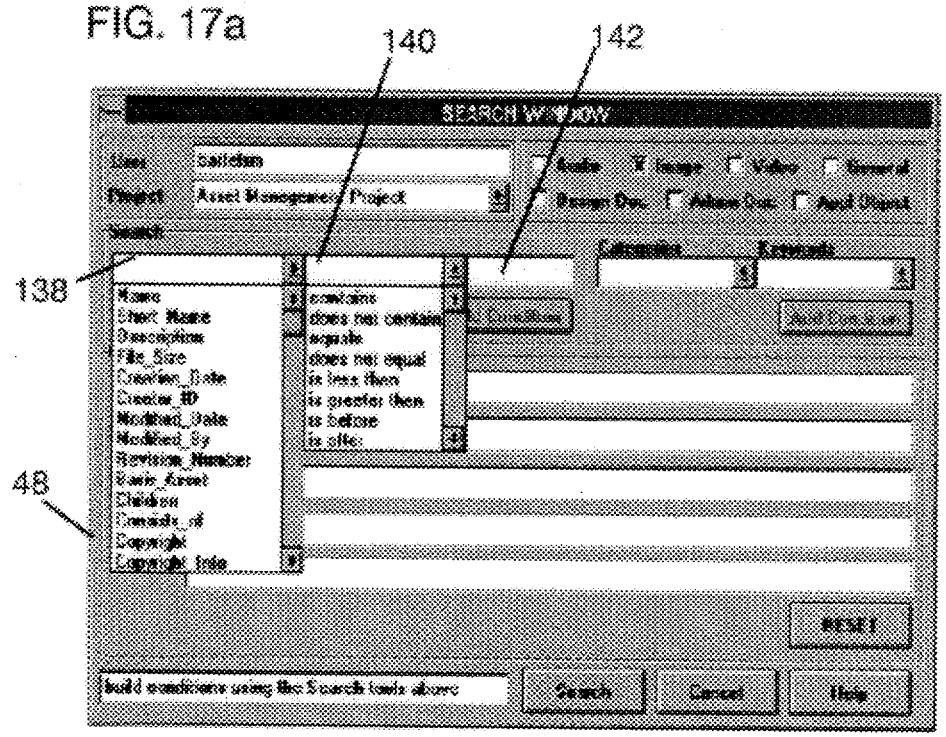

The search dialog box 48 contains three search fields 138, 140 and 142. Sequentially using the search fields 138, 140 and 142, the user can define one component of a search. The left-most search field 138 is a non-editable, single-selection list box that lists the fields of the asset data structure (as described above) that can be searched, e.g., the "name," "description," "creation_date," "modify_date," etc. fields. The list of fields is displayed upon selection of the adjacent down-arrow, as illustrated in FIG. 17a. The middle search field 140 is also a non-editable, single-select list box. As shown in FIG. 17a, this list box lists the various search types that can be applied to the field selected in the left-most search field 138. The right-most search field 142 is an editable field in which the user specifies the qualifying data for the field specified in the left-most search field 138, based upon the search type specified in the middle search field 140.

The search types that can be specified in the middle search field 140, depending on the field specified in the left-most search field 138, comprise: contains, does not contain, equals, does not equal, is less than, is greater than, is before, is after, etc. As an example, the "creation_date" field can be specified in the left-most search field 138, the "equals" search type can be specified in the middle search field 140, and the text "Apr. 5, 1996" is entered in the right-most search field 142. This example specifies a search for assets that were created after Apr. 5, 1996. Upon selection of the "add condition" button 144, the multimedia asset management program 22 checks to see whether proper selections were made in the left-most and middle search fields 138 and 140 and that the right-most search field 142 was filled. If not, the user is prompted to fill in the appropriate fields. If the search fields 138, 140 and 142 are properly completed, the search query defined by these fields is placed in the next available query line 146 in the query section 148 of the search dialog box 48. The current entries in the fields 138, 140 and 142 are then cleared.

Other search components can then be sequentially defined by use of the search fields 138, 140 and 142 and the "add condition" button 144. Subsequent search components are added to the next empty query line 146 of the query section 148. Radio "and/or" buttons 46 exist between "query" fields 146 for the user to specify how search components are to be combined. If the "and" button is selected, the conditions specified in the two query lines between which the "and/or" radio buttons straddle must be satisfied. On the other hand, if the "or" button is selected, only one of these two search conditions need be satisfied. The search query is built from the top to bottom of the query lines 146, so that the operator "and/or" precedence is from top to bottom.

Figure 17B:
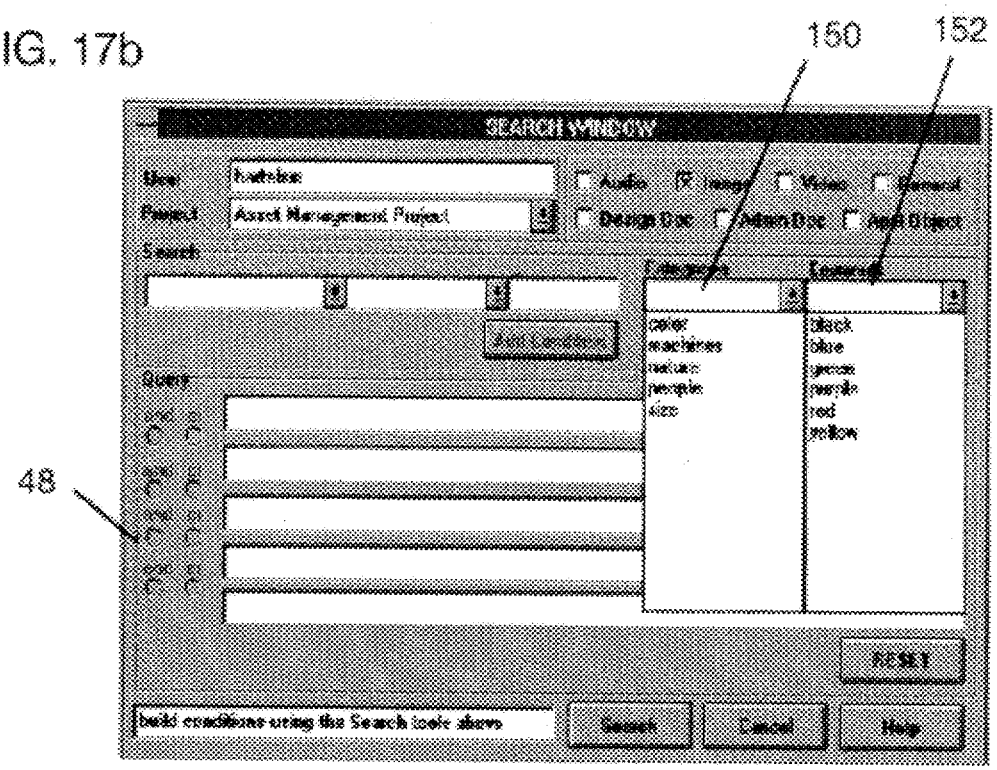

The user can specify a category-keyword combination as a search component by way of the "categories" and "keywords" fields 46 and 152 of the search dialog box shown in FIG. 17. The "categories" field 46 is a non-editable, single-select list box that lists possible categories of keywords. This list of possible keywords is obtained from the sessions data object 120. The user selects one of the categories of keywords listed in the "categories" field 46 as shown in FIG. 17b. The "keywords" field 152 is a non-editable, single-select list box that lists the keywords falling within the selected category of keywords. This list of keywords is obtained from the session data object 120. The user then selects one of the keywords listed in the "keywords" field 152. The user adds the search component specified by the "categories" and "keywords" fields 46 and 152 by selecting the "add condition" button 154. Upon selection of the "add condition" button 154, the multimedia asset management program adds the selected category-keyword combination into the next available query line 146, and then clears the "category" and "keyword" fields 46 and 152.

Once the query lines 146 are all full, the "add conditions" buttons 144 and 154 are deactivated so that no further search components or conditions can be specified.

If the user selects the "reset" button positioned towards the bottom of the search dialog box 48, all the fields are cleared except for the "user" and "project" fields. If the user selects the "cancel" button, the search window 48 is closed and the browser window 46 shown in FIG. 16 is again displayed. On the other hand, if the user selects the "search" button, the search object 48 looks to see that at least the "project" field has been selected, and then creates an internal search string based on the contents of the "project" field, the asset type(s) selected, and the query lines 146.

Figure 16A:
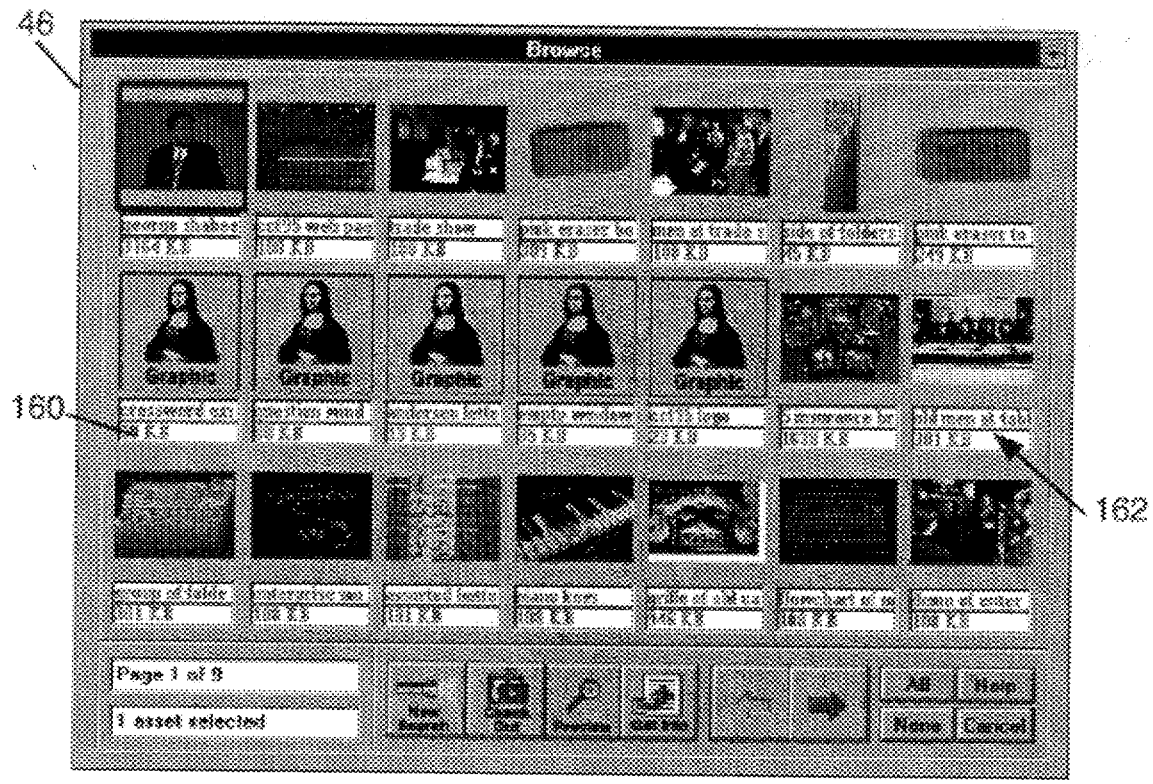

As depicted in FIG. 4, the search is submitted to the database access object 126. The database access object 126 requests the database management software 14 on the server 10 to perform the specified search. The server 10 returns the search results (i.e., a set of pointers to the assets that satisfied the search string) to the database access object 126, which in turn returns the search results to the search object 48. The names of the found assets, and the thumbnails for any image assets, are also returned to the browser object 46. The browser object 46 in turn displays the search results in the results area 160 of the browse dialog box 46, as illustrated in FIG. 16a. Each asset located by the search is displayed as an icon 162. The icons 162 include the asset name (contained in the "name" field of the asset record) and the file size below the asset name. For image assets, the icon 162 is the thumbnail representation of the asset. Other assets are represented by a standard icon for the particular asset type.

The icons 162 can be selected, e.g., by clicking on one of the icons using a computer mouse. If one of the icons 162 is single-selected, e.g., clicked on once with a mouse, the selected icon 162 is highlighted to show its selected state. A "preview" button is displayed at the bottom of the browse dialog box 46. If only one icon 162 is selected, the "preview" button is enabled. If enabled, selection of the "preview" button causes the asset represented by the selected icon to be previewed, as described in greater detail below. Alternatively, the user can double select, e.g., double-click using a mouse, one of the icons 162 to preview the asset identified by the selected icon.

Previewing an asset by either double-selecting an icon 162 or use of the "preview" button causes the contents of the asset to be previewed by calling a viewer program associated with the type of asset selected, e.g., Paint Brush for viewing images and Media Player for viewing (visually and/or audibly perceiving) audio and video, both offered by Microsoft Corporation. For example, if the selected asset is an image, the appropriate viewer displays the image on one of the output devices 28, e.g., a display screen. On the other hand, if the elected asset is audio, the appropriate viewer plays the audio content on one of the output devices 28, e.g., speakers. As depicted in FIG. 4 by the line interconnecting the browser/search object 46, 48 and the database access object 126, when an asset is selected for previewing, the browser/search object 46, 48 obtains the asset from the server 10 by way of the database access object 126.

Figure 16B:
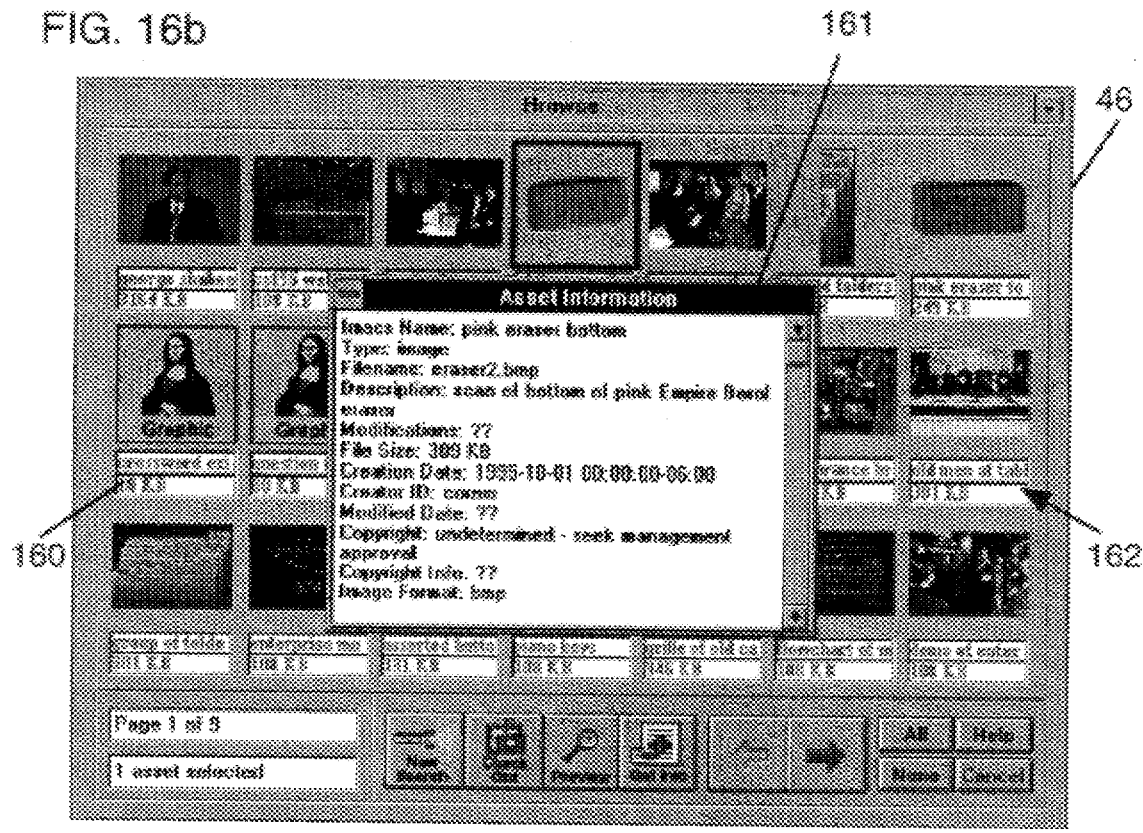

The user can also view descriptive information on one of the assets by selecting the asset and then selecting the "Get Info" button on the bottom of the browse dialog box 46. The browser object 46 obtains information regarding the asset from the asset's record on the server 10 by way of the database access object 126. As illustrated in FIG. 16b, the information retrieved and displayed can include the information contained in the following database fields in the asset's record: name; asset_type; filename; description; add_chg_desc; size; creation_date; creator_id; modified_date; copyright; copyright_info; and format. The information is displayed in an "asset information" window 161 over the browse dialog box 46, as shown in FIG. 16b.

The user can select all of the icons 162 displayed in the search results area 160 by selecting the "all" button at the bottom of the browse dialog box 46. The user can reset, i.e., remove, the selection of all icons 162 by way of the "none" button at the bottom of the browse dialog box 46. If the search found many assets satisfying the search so that the icons 162 span multiple pages of the search results area 160, the left and right arrow at the bottom of the browse dialog box 46 can be used to page forward and backward through the search results.

The user can begin a new search by selecting the "new search" button at the bottom of the browse dialog box 46. Upon selection of the "new search" button, the search dialog box 48 shown in FIG. 17 is displayed and pre-filled with the previous search query specification.

The user can check out one or more of the assets represented by an icon 162 in the search results area 160 by way of the "check-out" button at the bottom of the browse dialog box 46. The "check-out" button is deactivated unless one or more icons 162 have been selected.

The "check-out" button is also deactivated, preventing the check out of any of the assets found by way of the search, if the user is not assigned to the project to which the found assets are assigned. The determination is made by way of the user information contained in the session data object 120. This situation can occur when the user searched one of the common projects, but that specified project is not one of the projects assigned to the user. Any user can search and browse common projects. However, only users assigned to a project can check out assets from that project.

Figure 7:
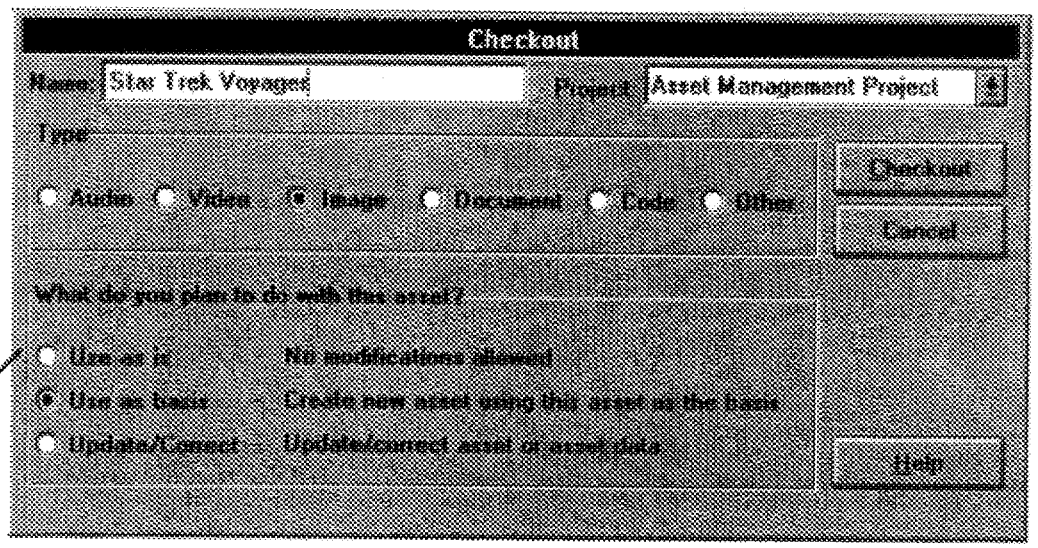
FIG. 7 shows a check-out user interface screen formed in accordance with the invention.

The "check-out" button is activated if one or more icons have been selected and the user is assigned to the project from which the assets were found. If activated, user selection of the "check-out" button begins the check-out procedure, as depicted in FIG. 4 by the line interconnecting the browser/search objects 46, 48 and the check-out object 50. If only one of the assets listed in the search results area 160 of the browse dialog box 46 is selected, the check-out dialog box 50 shown in FIG. 7 is displayed, and the check-out procedure as previously described is followed. After the check-out is completed from the check-out dialog box 50, the check-out dialog box 50 is closed and control returns to the browse window 46.

On the other hand, if multiple icons 162 have been selected in the search results area 160, the check-out dialog box 50 is not displayed. Rather, the selected assets are sequentially checked out automatically with the "use as is" check out type. The user is asked to confirm the check-out. Other than not displaying the check-out dialog box 50, the check-out procedure for each selected asset is the same as previously described. If the check-out is successful, the previously selected icons are deselected in the search results area 160 of the browse window 46.

E. Reports

Figure 18:
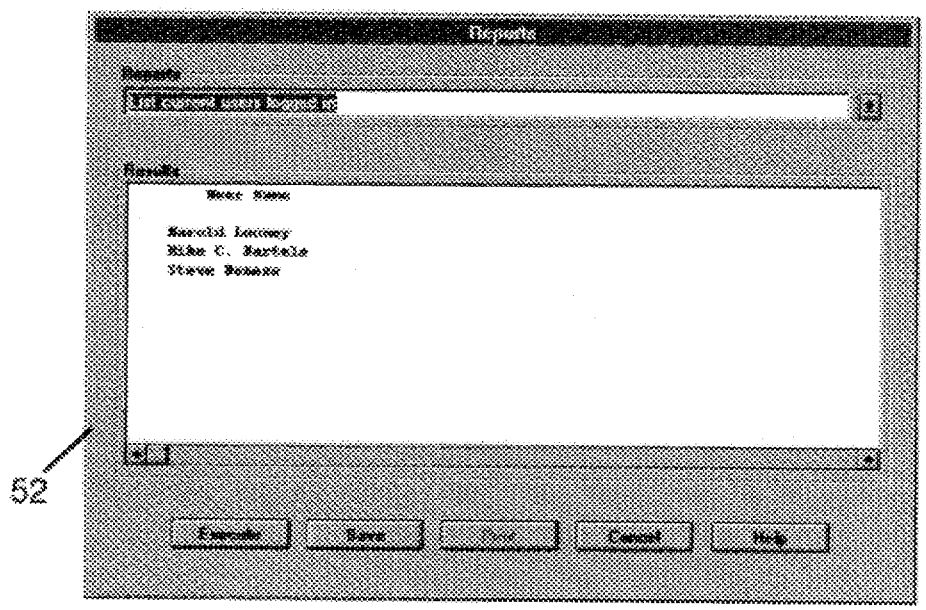
FIG. 18 shows a reports user interface screen formed according to the invention.

By selecting the "reports" button 68 on the toolbar dialog box 40, the reports function is launched, as depicted in FIG. 4 by the line interconnecting the toolbar object 40 and the reports object 52. The "reports" dialog box 52 shown in FIG. 18 is displayed. Only users with a Manager User level, specified in the "user_level" field of the staff table 82, are allowed to invoke the "reports" dialog box 52. The reports dialog box 52 includes a "reports" field in which the user can select one or more report types. The "reports" field is a non-editable, multiple select list box. The user selects one or more report types from this list box. The user can only generate reports for projects to which the user is assigned, i.e., the projects listed in the "assigned_projects" field of the staff table 82. The available report types include: a list of all assets checked out by a specified date; a list of all assets created by a specified date; a list of all assets created from existing assets by a specified date; the history of a particular asset; the assets currently checked out by a specified user; all assets currently checked out, broken down user-by-user; and a list of all users currently logged in.

Upon selection of one or more of the report types, the "execute" button at the bottom of the reports dialog box 52 is activated. Once activated, user selection of the "execute" button causes the multimedia asset management program 22 to determine whether additional information is needed for the requested report type(s). If additional information is required, the user is prompted for the needed information. The reports object 52 then calls the database access object 126 to access the database on the server 10 to obtain the information for the report, as depicted in FIG. 4 by the line interconnecting the reports object 52 and the database object 126. Upon obtaining the database information, the database access object 126 returns the information to the reports object 52, which then provides the report in the "results" area of the reports dialog box 52.

Upon display of the report in the "results" area, the "execute" button is deactivated and the "save" and "print" buttons on the bottom of the reports dialog box 52 are activated. The user can save the results report by selecting the "save" button, upon which the user is prompted for the file name in which to save the report as a text file. If the user selects the "print" button, the user is prompted to specify a printer and the results are then sent to the selected printer. Upon user selection of the "cancel" button on the bottom of the reports dialog box 52, the reports dialog box is closed and control returns to the toolbar object 40, which displays the toolbox 40 shown in FIG. 5.

F. Logout

Figure 19:
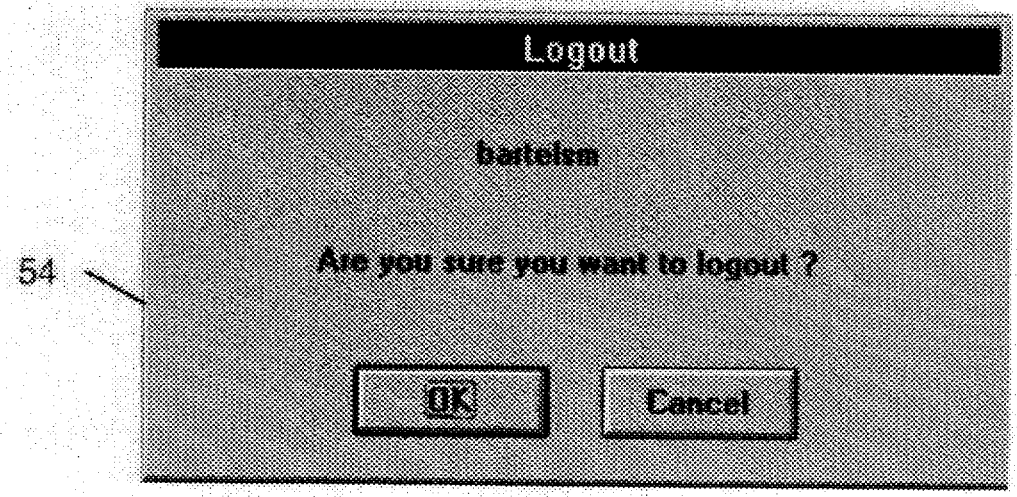
FIG. 19 shows a logout user interface screen according to the invention.

If the user selects the "login/logout" button 60 on the toolbar dialog box 40 while the user is logged-in, the logout dialog box 54 shown in FIG. 19 is displayed. The logout dialog box 54 lists the user name and asks the user to confirm that he/she wishes to logout. If the user selects the "cancel" button on the logout dialog box 54, the logout is aborted, the logout dialog box 54 is closed, and the toolbar dialog box 40 is again displayed. Alternatively, the user confirms the logout by selecting the "OK" button. If assets are currently checked out to the user, a further dialog box is displayed, informing the user of the number of assets checked out to the user. The user is asked whether he/she wishes to still logout, despite the fact that assets are checked out. If the user confirms the logout, the logout continues. Alternatively, the user can cancel the logout, in which case the logout dialog box 54 is closed and the toolbar dialog box 40 is again displayed.

If the user confirms the logout, the multimedia asset management program 22 logs the user out. The user information is cleared from the session data object 120, as depicted in FIG. 4 by the line interconnecting the logout object 54 and the session data object 120. The staff table 82 on the server is updated to reflect the logout, i.e., the "login_status" field in the staff table 82 for this user is updated. The logout dialog box 54 is then closed, the connection to the server is ended, and the toolbar dialog box 40 is again displayed.

G. Exit

Upon selection of the "exit" button 70 on the toolbar dialog box 40, the multimedia asset management program 22 is terminated if no user is currently logged-in. If a user is currently logged-in, the logout procedure described immediately above with respect to FIG. 19 is first followed. If the user chooses to logout, after the user logout is completed, the multimedia asset management program is terminated.

H. Utilities

Figure 20:
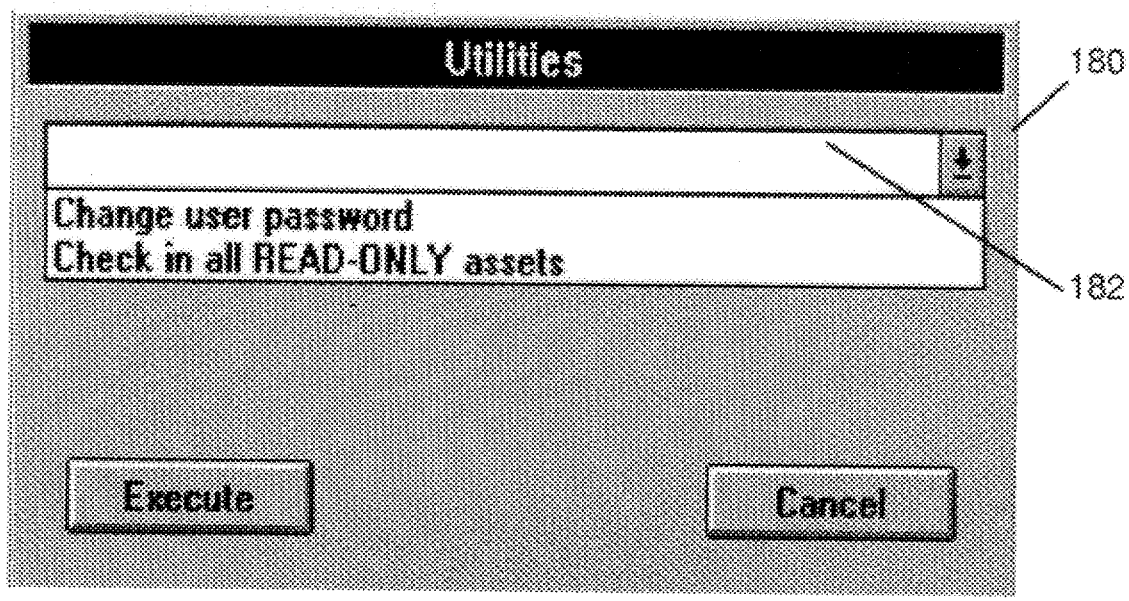
FIG. 20 shows a utilities user interface screen formed according to the invention.

Upon selection of the "utilities" button 72 on the toolbar dialog box 40, the utilities dialog box 180 shown in FIG. 20 is displayed. The operation of the utilities function is provided by way of a utilities software object. The utilities dialog box 180 contains a field 182 in which the user enters the type of utility function the user wishes to execute. The utility dialog box 180 lists the available utility functions; the user selects one of these. The utility functions depicted in FIG. 20 comprise changing the user password and checking in all assets currently checked out by the user with the use-as-is check-out type.

The utilities dialog box 180 has "execute" and "cancel" buttons. Upon selection of the "cancel" button, the utilities dialog box 180 is closed and the toolbar dialog box 40 is again displayed. If the "execute" button is selected, the utilities function specified by the user in the field 182 is performed. If the "check in all READ-ONLY assets" utility function is specified, all assets currently checked out by the user with the use-as-is check-out type are automatically checked in the manner previously described with respect to the check-in function. The utilities object calls the check-in object 44 to check in the assets.

Figure 21:
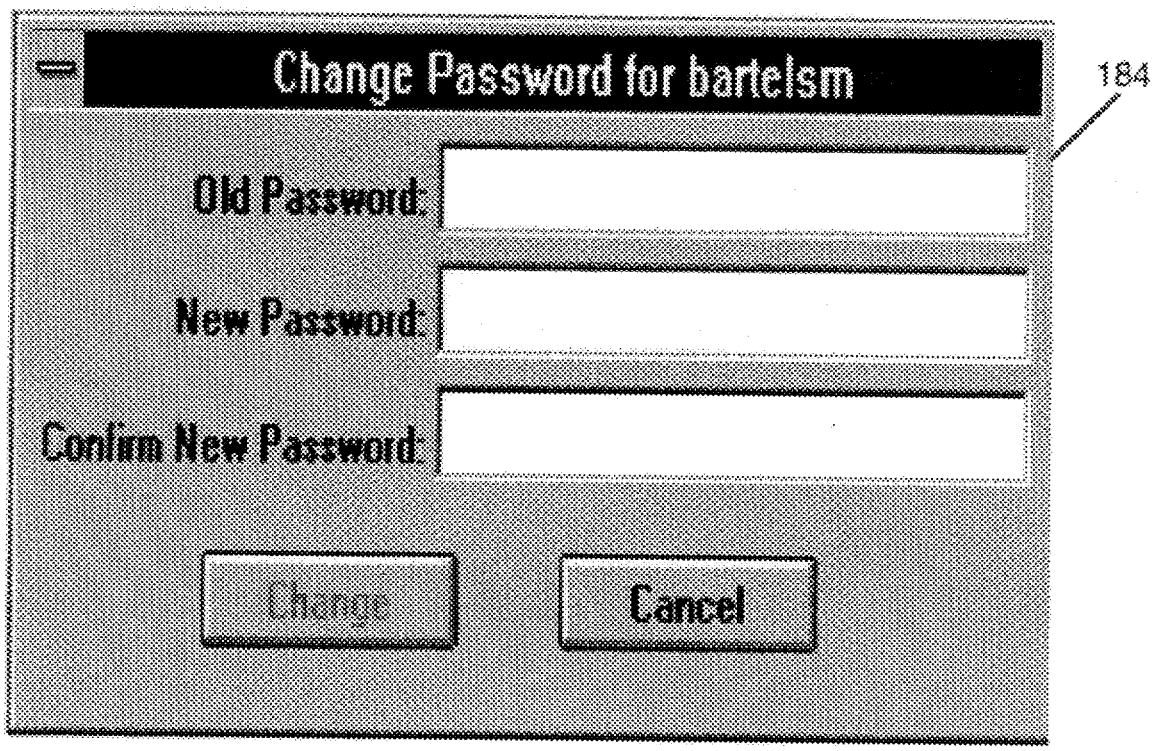
FIG. 21 shows a change-password user interface screen formed in accordance with the invention.

If the "change user password" utility function is specified, the "change password" dialog box 184 shown in FIG. 21 is displayed, the operation of which is provided by way of a password object. The change password dialog box 184 has three fields: an "old password" field in which the user enters his/her current password; a "new password" field in which the user enters the desired new password; and a "confirm"0 field in which the user re-enters the desired new password for confirmation. The user then selects a "change" button on the bottom of the change password dialog box 184 to initiate changing the password. The password object modifies the user password by way of the session data object 120 and the database access object 126. If instead the user selects a "cancel" button on the dialog box 184, the change password dialog box 184 is closed, and the utilities dialog box 180 is again displayed.

IV. System Implementation

Next, preferred system implementation details are described. In the preferred embodiment described herein, the server 10 depicted in FIG. 1 is an Indigo 2 Workstation from Silicon Graphics Incorporated with a minimum of: a 46 MHz Mips Microprocessor; 64 megabytes of random access memory (RAM); a 1-gigabyte SCSI disk drive for the server operating system; and a 10 gigabyte SCSI disk drive for the multimedia assets. The Irix 5.3 operating system with Extended File System (XFS) from Silicon Graphics Incorporated is used as the operating system for the server 10. The database management system software 14 is the hybrid object, relational-database management system (ORDBMS) Illustra from Illustra Information Technologies, now part of Informix Corporation. The Illustra database management system is used along with the VRI and text Datablades offered along with Illustra. In an alternative embodiment, the server computer 10 is formed by way of a personal computer having a Pentium Processor from Intel Corporation. The Windows NT 3.51 operating system from Microsoft Corporation can then be used as the server operating system.

The client computer 16 is a personal computer with a Pentium Processor from Intel Corporation. The client computer 16 includes at least 24 megabytes of random access memory, and the storage device 20 is at least a 1-gigabyte hard drive. The Windows NT 3.5 operating system from Microsoft Corporation is used as the client operating system. The Windows 95 operating system from Microsoft Corporation can also be used. The multimedia asset management program 22 is written using Visual C++2.0 from Microsoft Corporation, along with the Microsoft Foundation Classes MFC provided by Microsoft Corporation. Visual C++2.0 is an object-oriented programming language. The DB access object 24 uses a library of application interface (API) functions 23 provided along with the Illustra database management system. The client-side database management tool 21 is IQT, a graphical user interface database management tool offered along with Illustra.

While these system implementation details are provided, it is to be understood that various other hardware and software can be used to implement the multimedia asset management system 8.

The foregoing description of a preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computerized method of managing multimedia assets of one or more of image, video, audio, text, and program code media types, including the steps of:

(a) checking in multimedia assets of one or more of image, video, audio, text, and program code media types, upon a user's request, the checking-in step for each multimedia asset checked in including the steps of:

i) prompting the user for characteristics and identification information for a multimedia asset to be checked in; and ii) storing the multimedia asset to be checked in, along with any specified characteristics and identification information, in a database contained on a storage device;

(b) upon the user's request, searching the database for multimedia assets, including the steps of:

i) prompting the user for a search strategy based on one or more of asset characteristics and asset identification information;

ii) searching the database for multimedia assets that satisfy the user-specified search strategy; and iii) reporting any multimedia assets found to satisfy the search strategy; and (c) upon the user's request, selectively checking out a multimedia asset contained in the database, including the steps of:

i) prompting the user for a multimedia asset to be checked out, and prompting the user for one of multiple check-out types;

ii) determining if the user-specified check-out is allowed based on predetermined criteria; and iii) if the user-specified check-out is allowed, copying the multimedia asset to be checked out, for use by the user, and storing an indication of the check-out and the type of check-out in the database.

2. The computerized method of claim 1, further comprising previewing a multimedia asset upon user request, including the steps of:

receiving a user-selection of an multimedia asset to be previewed; and retrieving the user-selected multimedia asset from the database for preview by the user.

3. The computerized method of claim 1, wherein the computerized method is implemented in a client-server computer architecture, such that the user is prompted for input data and user selections on a client computer and the database is stored on a server computer.

4. The computerized method of claim 1, wherein implementation of the computerized method includes a computer program implemented in an object-oriented programming paradigm.

5. The computerized method of claim 1, wherein the multiple check-out types include:

a first check-out type, wherein a multimedia asset checked out with the first check-out type specified cannot be modified;

a second check-out type, wherein a multimedia asset checked out with the second check-out type specified can be used as a basis for creating another multimedia asset; and a third check-out type, wherein a multimedia asset checked out with the third check-out type specified can be modified and subsequently checked in to the database in modified form.

6. The computerized method of claim 5, wherein the predetermined check-out criteria include:

prohibiting a check-out of the multimedia asset to be checked out if the third check-out type is specified and the multimedia asset to be checked out is presently checked out; and prohibiting a check-out of the multimedia asset to be checked out if the multimedia asset to be checked out is already checked out with the third check-out type specified.

7. The computerized method of claim 1, wherein if the multimedia asset to be checked in is presently checked out, the checking-in step for the multimedia asset to be checked in further includes updating the database to reflect the check-in.

8. The computerized method of claim 1, wherein the characteristics and identification information for which the user is prompted during the checking-in step for the multimedia asset to be checked in includes:
an asset name;
keyword categories and keywords within the keyword categories;
an asset type; and
a written description.

9. The computerized method of claim 8, wherein the characteristics and identification information for which the user is prompted during the checking-in step for the multimedia asset to be checked in further includes:
a project name;
copyright data; and
cost data.

10. The computerized method of claim 8, wherein the step of prompting the user for a search strategy includes prompting the user for:
an asset name;
keyword categories and keywords within the keyword categories;
an asset type; and
a written description.

11. The computerized method of claim 1, wherein the computerized method utilizes a check-out table to maintain a record of which multimedia assets are checked out, wherein the checking out step further includes making an entry in the check-out table to reflect the check-out, and wherein the checking in step further includes updating the check-out table to reflect the check-in.

12. The computerized method of claim 1, wherein upon request of the user, one or more of any assets found to satisfy the user-specified search strategy in the search for multimedia assets are checked out, one at a time or at the same time based on a user selection.

13. The computerized method of claim 12, wherein the multiple check-out types include:
a first check-out type, wherein a multimedia asset checked out with the first check-out type specified cannot be modified;
a second check-out type, wherein a multimedia asset checked out with the second check-out type specified can be used a basis for creating another multimedia asset; and
a third check-out type, wherein a multimedia asset checked out with the third check-out type specified can be modified and subsequently checked in to the database in modified form.

14. The computerized method of claim 13, wherein if the user selects to check out multiple assets at the same time, each asset is automatically checked out with the first check-out type.

15. The computerized method of claim 1, wherein access of a user to multimedia assets checked into the system is controlled based on pre-defined criteria.

16. The computerized method of claim 15, wherein the checking in step further includes assigning, to a project, the multimedia asset to be checked in, and further wherein the user is given access privilege to one or more projects, and the access of the user to multimedia assets checked in and stored on the database is limited to multimedia assets assigned to a project to which the user has access privilege.

17. The computerized method of claim 1, further including the step of reporting system information to the user, including the steps of:
prompting the user for a specification of the system information desired;
generating the user-specified system information; and
reporting the user-specified system information to the user.

18. The computerized method of claim 17, wherein the system information the user can specify for reporting includes one or more of:
multimedia assets checked out up to a user-specified date;
new multimedia assets checked in since a user-specified date;
multimedia assets created and checked in based on existing multimedia assets checked in up to a user-specified date;
multimedia asset history of a user-specified multimedia asset;
multimedia assets currently checked out; and
a list of current users of the computerized method.

19. A computerized multimedia asset management system for managing multimedia assets of one or more of image, video, audio, text, and program code media types, the management system including:
a processor;
memory coupled to the processor;
a storage device coupled to the processor;
an input device coupled to the processor; and
an output device coupled to the processor;
wherein the processor, the memory, the storage device, the input device, and the output device are configured to:
(a) check-in multimedia assets of one or more of image, video, audio, text, and program code media types including two or more of image, video, audio, text and program code media types, into the computerized multimedia asset management system upon a user's request, the check-in for each multimedia asset to be checked in including the steps of:
prompting the user for characteristics and identification information for a multimedia asset to be checked in; and
loading the multimedia asset to be checked in, along with any user-specified characteristics and identification information, into a database contained on the storage device;
(b) search for multimedia assets contained in the database upon the user's request, including the steps of:
prompting the user for a search strategy based on one or more of asset characteristics and asset identification information;
searching the database for multimedia assets that satisfy the user-specified search strategy; and
reporting any assets found to satisfy the user-specified search strategy on the output device; and
(c) check out a multimedia asset contained in the database upon the use's request, including the steps of:
prompting the user for a multimedia asset to be checked out, and prompting the user for one of multiple check-out types;
determining if the user-requested check-out is allowed based on predetermined criteria; and if the check-out is allowed, copying the multimedia asset to be checked out, for use by the user, and storing an indication of the check-out and the type of check-out in the database.

20. The computerized multimedia asset management system of claim 19, wherein the system is further configured to preview, on the output device, upon the user's request, a user-specified multimedia asset contained in the database by steps including:

receiving a user-selection of an multimedia asset to be previewed; and retrieving the user-selected multimedia asset from the database for preview by the user.

21. The computerized multimedia asset management system of claim 19, wherein the management system is implemented in a client-server computer architecture.

22. The computerized multimedia asset management system of claim 19, wherein the management system includes a computer program implemented in an object-oriented programming paradigm.

23. The computerized multimedia asset management system of claim 19, configured so that the multiple check-out types include:

a first check-out type, wherein a multimedia asset checked out with the first check-out type specified cannot be modified;

a second check-out type, wherein a multimedia asset checked out with the second check-out type specified can be used as a basis for creating another multimedia asset; and a third check-out type, wherein a multimedia asset checked out with the third check-out type specified can be modified and subsequently checked in to the database in modified form.

24. The computerized multimedia asset management system of claim 23, configured so that the predetermined check out criteria include:

prohibiting a check-out of the multimedia asset to be checked out if the third check-out type is specified and the multimedia asset to be checked out is presently checked out; and prohibiting a check-out of the multimedia asset to be checked out if the multimedia asset to be checked out is already checked out with the third check-out type specified.

25. The computerized multimedia asset management system of claim 19, configured so that, if the multimedia asset to be checked in is presently checked out, the check-in of the multimedia asset to be checked in further includes updating the database to reflect the check-in.

26. The computerized multimedia asset management system of claim 19, configured so that the characteristics and identification information for which the user is prompted during the check-in of the multimedia asset to be checked in includes:

an asset name;

keyword categories and keywords within the keyword categories;

an asset type; and a written description.

27. The computerized multimedia asset management system of claim 26, configured so that the characteristics and identification information for which the user is prompted during the check-in of the multimedia asset to be checked in further includes:

a project name;

copyright data; and cost data.

28. The computerized multimedia asset management system of claim 26, configured so that the prompting the user for a search strategy includes prompting the user for:

an asset name;

keyword categories and keywords within the keyword categories;

an asset type; and a written description.

29. The computerized multimedia asset management system of claim 19, further including a check-out table to maintain a record of which multimedia assets are checked out, and wherein the computerized multimedia asset management system is configured so that the check-out table is updated each time a multimedia asset is checked in or checked out.

30. The computerized multimedia asset management system of claim 19, wherein the system is further configured so that, upon user selection, one or more of any assets found to satisfy the user-specified search strategy in the search for multimedia assets can be checked out, one at a time or at the same time based on a user selection.

31. The computerized multimedia asset management system of claim 30, configured so that the multiple check-out types include:

a first check-out type, wherein a multimedia asset checked out with the first check-out type specified cannot be modified;

a second check-out type, wherein a multimedia asset checked out with the second check-out type specified can be used a basis for creating another multimedia asset; and a third check-out type, wherein a multimedia asset checked out with the third check-out type specified can be modified and subsequently checked in to the database in modified form.

32. The computerized multimedia asset management system of claim 31, configured so that if the user selects to check out multiple assets at the same time, each asset is automatically checked out with the first check-out type.

33. The computerized multimedia asset management system of claim 19, configured so that access of a user to multimedia assets checked into the system is controlled based on pre-defined criteria.

34. The computerized multimedia asset management system of claim 33, configured so that multimedia assets checked into the system are assigned to a project, the user is given access privilege to one or more projects, and the access of the user to multimedia assets checked into the system is limited to multimedia assets assigned to a project to which the user has access privilege.

35. The computerized multimedia asset management system of claim 19, wherein the system is further configured to report user-specified information concerning the system.

36. The computerized multimedia asset management system of claim 35, wherein the user-specified information to report includes one or more of:

multimedia assets checked out up to a user-specified date;
new multimedia assets checked in since a user-specified date;
multimedia assets created and checked in based on existing multimedia assets checked in the system up to a user-specified date;
multimedia asset history of a user-specified multimedia asset;
multimedia assets currently checked out; and
a list of users presently accessing the system.

37. A computer readable program storage medium tangibly embodying a program of instructions, executable by a computer to achieve management of multimedia assets of one or more of image, video, audio, text, and program code media types, to perform the steps of:

(a) checking in multimedia assets of one or more of image, video, audio, text, and program code media types, upon a user's request, the checking-in step for each multimedia asset checked in including the steps of:
  i) prompting the user for characteristics and identification information for a multimedia asset to be checked in; and
  ii) storing the multimedia asset to be checked in, along with any specified characteristics and identification information, in a database contained on a storage device;

(b) upon the user's request, searching the database for multimedia assets, including the steps of:
  i) prompting the user for a search strategy based on one or more of asset characteristics and asset identification information;
  ii) searching the database for multimedia assets that satisfy the user-specified search strategy; and
  iii) reporting any multimedia assets found to satisfy the search strategy; and (c) upon the user's request, selectively checking out a multimedia asset contained in the database, including the steps of:
  i) prompting the user for a multimedia asset to be checked out, and prompting the user for one of multiple check-out types;
  ii) determining if the user-specified check-out is allowed based on predetermined criteria; and
  iii) if the user-specified check-out is allowed, copying the multimedia asset to be checked out, for use by the user, and storing an indication of the check-out and the type of check-out in the database.

38. The computer readable program storage medium of claim 37, wherein the program of instructions includes further instructions to preview a multimedia asset upon user request, including the steps of:
  receiving a user-selection of an multimedia asset to be previewed; and
  retrieving the user-selected multimedia asset from the database for preview by the user.

39. The computer readable program storage medium of claim 37, wherein the program of instructions is for execution by a computer configured as a client in a client-server computer architecture, so that the user is prompted for input data and user selections on the client computer and the database is stored on a server computer.

40. The computer readable program storage medium of claim 37, wherein the program of instructions is implemented in an object-oriented programming paradigm.

41. The computer readable program storage medium of claim 37, wherein the multiple check-out types include:

a first check-out type, wherein a multimedia asset checked out with the first check-out type specified cannot be modified;

a second check-out type, wherein a multimedia asset checked out with the second check-out type specified can be used as a basis for creating another multimedia asset; and a third check-out type, wherein a multimedia asset checked out with the third check-out type specified can be modified and subsequently checked in to the database in modified form.

42. The computer readable program storage medium of claim 41, wherein the predetermined check-out criteria include:

prohibiting a check-out of the multimedia asset to be checked out if the third check-out type is specified and the multimedia asset to be checked out is presently checked out; and prohibiting a check-out of the multimedia asset to be checked out if the multimedia asset to be checked out is already checked out with the third check-out type specified.

43. The computer readable program storage medium of claim 37, wherein if the multimedia asset to be checked in is presently checked out, the checking-in step for the multimedia asset to be checked in further includes updating the database to reflect the check-in.

44. The computer readable program storage medium of claim 37, wherein the characteristics and identification information for which the user is prompted during the checking-in step for the multimedia asset to be checked in includes:

an asset name;
keyword categories and keywords within the keyword categories;
an asset type; and
a written description.

45. The computer readable program storage medium of claim 44, wherein the characteristics and identification information for which the user is prompted during the checking-in step for the multimedia asset to be checked in further includes:

a project name;
copyright data; and
cost data.

46. The computer readable program storage medium of claim 44, wherein the step of prompting the user for a search strategy includes prompting the user for:

an asset name;
keyword categories and keywords within the keyword categories;
an asset type; and
a written description.

47. The computer readable storage medium of claim 37, wherein the program of instructions includes further instructions to maintain a check-out table to maintain a record of which multimedia assets are checked out, wherein the checking out step further includes making an entry in the check-out table to reflect the check-out, and wherein the checking in step further includes updating the check-out table to reflect the check-in.

48. The computer readable program storage medium of claim 37, wherein the program of instructions includes further instructions to check out, upon request of the user, one or more of any assets found to satisfy the user-specified search strategy in the search for multimedia assets, one at a time or at the same time based on a user selection.

49. The computer readable program storage medium of claim 48, wherein the multiple check-out types include:

- a first check-out type, wherein a multimedia asset checked out with the first check-out type specified cannot be modified;
- a second check-out type, wherein a multimedia asset checked out with the second check-out type specified can be used a basis for creating another multimedia asset; and
- a third check-out type, wherein a multimedia asset checked out with the third check-out type specified can be modified and subsequently checked in to the database in modified form.

50. The computer readable program storage medium of claim 49, wherein if the user selects to check out multiple assets at the same time, each asset is automatically checked out with the first check-out type.

51. The computer readable program storage medium of claim 37, wherein the program of instructions includes further instructions to control access of a user to multimedia assets checked into the system based on pre-defined criteria.

52. The computer readable program storage medium of claim 51, wherein the checking in step further includes assigning, to a project, the multimedia asset to be checked in, and further wherein the user is given access privilege to one or more projects, and the access of the user to multimedia assets checked in and stored on the database is limited to multimedia assets assigned to a project to which the user has access privilege.

53. The computer readable program storage medium of claim 37, wherein the program of instructions include further instructions to perform the step of reporting system information to the user, including the steps of:

- prompting the user for a specification of the system information desired;
- generating the user-specified system information; and
- reporting the user-specified system information to the user.

54. The computer readable program storage medium of claim 53, wherein the system information the user can specify for reporting includes one or more of:

- multimedia assets checked out up to a user-specified date;
- new multimedia assets checked in since a user-specified date;
- multimedia assets created and checked in based on existing multimedia assets checked in up to a user-specified date;
- multimedia asset history of a user-specified multimedia asset;
- multimedia assets currently checked out; and
- a list of current users of the computerized method.

* * * * *

UNITED STATES PATENT AND TRADEMARK OFFICE
CERTIFICATE OF CORRECTION

PATENT NO. : 5,752,244
DATED : MAY 12, 1998
INVENTOR(S) : ROSE ET AL.

It is certified that error appears in the above-identified patent and that said Letters Patent is hereby corrected as shown below:

title page, [57] Abstract, line 15: "wheterh" should read —whether—

Col. 5, line 63: insert —. The keywords table 106 is used— after "assets")"

Col. 6, line 45: "manage" should read —"manager"—

Col. 8, line 12: "check_out time" should read —check_out_time—

Col. 9, line 6: move "numeric (6,1)" back one column, under "Type"

Col. 9, line 18: insert — = 0— after "Default"

Col. 10, line 30: "creat" should read —create—

Col. 24, line 63: delete "0" after "confirm"

Signed and Sealed this

Fourteenth Day of September, 1999

*Attest:*

Q. TODD DICKINSON

*Attesting Officer*     *Acting Commissioner of Patents and Trademarks*